(12) United States Patent
Guo et al.

(10) Patent No.: US 11,330,635 B2
(45) Date of Patent: May 10, 2022

(54) INFORMATION TRANSMISSION METHOD AND APPARATUS

(71) Applicant: Huawei Technologies Co., Ltd., Shenzhen (CN)

(72) Inventors: Zhiheng Guo, Beijing (CN); Fredrik Berggren, Kista (SE); Xinqian Xie, Beijing (CN); Yue Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 16/811,478

(22) Filed: Mar. 6, 2020

(65) Prior Publication Data

US 2020/0214045 A1 Jul. 2, 2020

Related U.S. Application Data

(63) Continuation of application No. PCT/CN2018/103776, filed on Sep. 3, 2018.

(30) Foreign Application Priority Data

Sep. 8, 2017 (CN) .................. 201710807910.4

(51) Int. Cl.
*H04W 74/08* (2009.01)
*H04W 72/04* (2009.01)
*H04W 74/00* (2009.01)

(52) U.S. Cl.
CPC ..... *H04W 74/0833* (2013.01); *H04W 72/042* (2013.01); *H04W 72/044* (2013.01); *H04W 74/006* (2013.01)

(58) Field of Classification Search
None
See application file for complete search history.

(56) References Cited

U.S. PATENT DOCUMENTS 8,416,892 B2 * 4/2013 Mauritz ............ H04W 74/0833
375/343
8,599,974 B2 * 12/2013 Mauritz .............. H04J 13/0055
375/343
(Continued)

FOREIGN PATENT DOCUMENTS

CN 101217793 A 7/2008
CN 101345577 A 1/2009
(Continued)

OTHER PUBLICATIONS

LG Electronics, Discussion on NR PRACH Preamble format, 3GPP TSG RAN WG1 Meeting #90, R1-1713128, Aug. 21-25, 2017, 10 pages, Prague, Czech Republic.
(Continued)

*Primary Examiner* — Ayaz R Sheikh
*Assistant Examiner* — Faiyazkhan Ghafoerkhan
(74) *Attorney, Agent, or Firm* — Slater Matsil, LLP

(57) ABSTRACT

This application provides an information transmission method and apparatus. The method includes: sending, by a network device, first information, where the first information indicates a first parameter, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or at least one of 153, 137, 122, 109, 97, 85, 81, 77, 74, 71, 68, 65, 63, 60, 57, 55, 53, 51, 50, 48, 47, and 45. According to the information transmission method and apparatus provided in this application, information used to generate a random access preamble sequence can be configured for a terminal device.

22 Claims, 5 Drawing Sheets

(56) References Cited

U.S. PATENT DOCUMENTS

| | | | | |
|---|---|---|---|---|
| 8,862,172 B1* | 10/2014 | Vujcic | ................. | H04W 48/12 |
| | | | | 455/515 |
| 8,913,696 B2* | 12/2014 | Mauritz | ............. | H04W 28/065 |
| | | | | 375/343 |
| 9,445,437 B2* | 9/2016 | Vujcic | ................. | H04W 48/12 |
| 9,578,660 B2* | 2/2017 | Vujcic | ................ | H04W 74/004 |
| 9,713,172 B2* | 7/2017 | Vujcic | ................ | H04J 13/0062 |
| 9,748,990 B2* | 8/2017 | Wu | ..................... | H04L 27/2613 |
| 9,814,076 B2* | 11/2017 | Kim | ................... | H04W 56/0045 |
| 10,485,030 B2* | 11/2019 | Hui | ................... | H04W 36/0077 |
| 10,548,171 B2* | 1/2020 | Lee | ................... | H04W 74/0833 |
| 11,006,458 B2* | 5/2021 | Tang | ................. | H04W 74/0833 |
| 11,039,478 B2* | 6/2021 | Kwak | .................. | H04L 5/0044 |
| 2009/0073944 A1* | 3/2009 | Jiang | ........................ | H04J 11/00 |
| | | | | 370/338 |
| 2010/0074372 A1* | 3/2010 | Mauritz | ............. | H04W 28/065 |
| | | | | 375/319 |
| 2011/0150156 A1* | 6/2011 | Xue | ................... | H04J 13/0062 |
| | | | | 375/354 |
| 2011/0249549 A1* | 10/2011 | Hao | ....................... | H04J 13/16 |
| | | | | 370/208 |
| 2012/0051292 A1* | 3/2012 | Mauritz | ............. | H04J 13/0055 |
| | | | | 370/328 |
| 2014/0036831 A1* | 2/2014 | Mauritz | ............ | H04W 74/0833 |
| | | | | 370/329 |
| 2014/0140301 A1* | 5/2014 | Hao | ....................... | H04J 13/16 |
| | | | | 370/329 |
| 2014/0293918 A1* | 10/2014 | Vujcic | .................. | H04W 48/12 |
| | | | | 370/329 |
| 2014/0341010 A1* | 11/2014 | Jiang | .................. | H04L 27/2613 |
| | | | | 370/208 |
| 2014/0376494 A1* | 12/2014 | Vujcic | ................ | H04W 74/004 |
| | | | | 370/329 |
| 2015/0085689 A1* | 3/2015 | Vos | ........................ | H04W 4/18 |
| | | | | 370/252 |
| 2015/0085810 A1* | 3/2015 | Mauritz | ............. | H04J 13/0055 |
| | | | | 370/329 |
| 2015/0163829 A1* | 6/2015 | Li | ..................... | H04W 74/0833 |
| | | | | 370/329 |
| 2015/0327218 A1* | 11/2015 | Kim | ..................... | H04W 74/08 |
| | | | | 370/329 |
| 2015/0351061 A1* | 12/2015 | Kim | ..................... | H04W 24/08 |
| | | | | 370/252 |
| 2015/0359003 A1* | 12/2015 | Kim | .................. | H04W 74/0891 |
| | | | | 370/336 |
| 2015/0373656 A1* | 12/2015 | Kim | .................. | H04W 56/0085 |
| | | | | 370/350 |
| 2016/0233903 A1* | 8/2016 | Wu | ...................... | H04J 13/0062 |
| 2016/0345365 A1* | 11/2016 | Vujcic | ............... | H04W 74/0866 |
| 2017/0055297 A1* | 2/2017 | Da | ....................... | H04L 27/2613 |
| 2017/0118778 A1* | 4/2017 | Vujcic | .................. | H04W 48/12 |
| 2019/0281635 A1* | 9/2019 | Kwak | .................. | H04L 5/0053 |
| 2020/0077445 A1* | 3/2020 | Tang | ................. | H04W 74/0833 |

FOREIGN PATENT DOCUMENTS

| | | |
|---|---|---|
| CN | 101873714 A | 10/2010 |
| CN | 102685892 A | 9/2012 |
| CN | 103718636 A | 4/2014 |
| CN | 105009479 A | 10/2015 |
| CN | 105208669 A | 12/2015 |
| CN | 109475010 A | 3/2019 |
| EP | 2640151 A1 | 9/2013 |
| WO | 2011100540 A1 | 8/2011 |

OTHER PUBLICATIONS

Huawei, HiSilicon, Cyclic-shift dimensioning and capacity shortfall solution for agreed NR PRACH formats, 3GPP TSG RAN WG1 Meeting NR#3, R1-1715390, Sep. 18-21, 2017, 19 pages, Nagoya, Japan.

"3rd Generation Partnership Project; Technical Specification Group Radio Access Network; Evolved Universal Terrestrial Radio Access (E-UTRA); Physical channels and modulation (Release 14)", 3GPP TS 36.211 V14.3.0 (Jun. 2017), 195 pages.

"3rd Generation Partnership Project; Technical Specification Group Radio Access Network; NR; Physical channels and modulation (Release 15)", 3GPP TS 38.211 V1.0.0 (Sep. 2017), 37 pages.

"3rd Generation Partnership Project; Technical Specification Group Radio Access Network; NR;Physical channels and modulation (Release 15)", 3GPP TS 38.211 V0.2.2 (Sep. 2017), 47 pages.

"3rd Generation Partnership Project;Technical Specification Group Radio Access Network;NR;Radio Resource Control (RRC); Protocol specification (Release 15)", 3GPP TS 38.311 V1.0.0 (Sep. 2017), 38 pages.

Zte, Sanechips, "Summary of off-line discussion of 6.1.4.1, Remaining details on PRACH formats", 3GPP TSG RAN WG1 Meeting NR#3, R1-1716892, Sep. 18-21, 2017, 4 pages, Nagoya, Japan.

"3rd Generation Partnership Project; Technical Specification Group Radio Access Network; NR;Physical channels and modulation(Release 15)", 3GPP TS 38.211 V1.0.1, Sep. 2017, 48 pages.

* cited by examiner

INFORMATION TRANSMISSION METHOD AND APPARATUS

CROSS-REFERENCE TO RELATED APPLICATIONS

This application is a continuation of International application PCT/CN2018/103776, filed on Sep. 3, 2018, which claims priority to Chinese Patent Application No. 201710807910.4, filed on Sep. 8, 2017. The disclosures of the aforementioned applications are hereby incorporated by reference in their entireties.

TECHNICAL FIELD

This application relates to the communications field, and more specifically, to an information transmission method and apparatus in the communications field.

BACKGROUND

A random access process plays a very important role in a wireless communications system, and is an important step in processes, performed by user equipment, such as an initial connection process, a handover process, a re-establishment selection process, and an uplink resource request process.

For the user equipment, a primary task of random access is generating and sending a random access preamble sequence. In a process of generating and sending the random access preamble sequence, the user equipment needs to first obtain information, such as a zero correlation zone or a set type, used to generate the random access preamble sequence from a network device; and then generate the random access preamble sequence based on the information and send the random access preamble sequence to the network device.

Therefore, a solution needs to be provided to resolve a problem of how to configure, for a terminal device, information used to generate a random access preamble sequence.

SUMMARY

This application provides an information transmission method and apparatus, to configure, for a terminal device, information used to generate a random access preamble sequence.

According to a first aspect, this application provides an information transmission method. The method includes: sending, by a network device, first information to a terminal device, where the first information is used to indicate a first parameter to be used by the terminal device to generate a random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45.

It should be understood that, in this embodiment of this application, that the first information is used to indicate the first parameter may be understood as that the first information explicitly indicates and/or implicitly indicates the first parameter. This is not limited in this embodiment of this application.

Optionally, the first parameter may be a zero correlation zone.

According to the information transmission method provided in this embodiment of this application, the network device can configure, for the terminal device, the first parameter used to generate the random access preamble sequence, and it is ensured that for each reuse factor, a value of the zero correlation zone is the largest, to be specific, a cell coverage distance is the longest.

With reference to the first aspect, in a first possible implementation of the first aspect, before the sending, by a network device, first information to a terminal device, the method further includes: determining, by the network device, the first parameter.

With reference to the first aspect or the first possible implementation of the first aspect, in a second possible implementation of the first aspect, the method further includes: sending, by the network device, second information to the terminal device, where the second information is used to indicate a set type to be used by the terminal device to generate the random access preamble sequence, and the set type includes an unrestricted set, a restricted set type A, or a restricted set type B.

It should be understood that, in this embodiment of this application, that the second information is used to indicate the set type may be understood as that the second information explicitly indicates and/or implicitly indicates the set type. This is not limited in this embodiment of this application.

With reference to the second possible implementation of the first aspect, in a third possible implementation of the first aspect, when the set type is the restricted set type A, the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

According to the information transmission method provided in this embodiment of this application, when the terminal device generates the random access preamble sequence by using the restricted set type A and the restricted set type B, it is ensured that for each reuse factor, the value of the zero correlation zone is the largest, to be specific, the cell coverage distance is the longest.

With reference to any one of the first aspect or the first to the third possible implementations of the first aspect, in a fourth possible implementation of the first aspect, the method further includes: sending, by the network device, third information to the terminal device, where the third information is used to indicate a time-frequency resource to be used by the terminal device to send the random access preamble sequence.

It should be understood that, in this embodiment of this application, that the third information is used to indicate the time-frequency resource may be understood as that the third information explicitly indicates and/or implicitly indicates the time-frequency resource. This is not limited in this embodiment of this application.

Optionally, a subcarrier spacing of a random access channel of a communications system in which the network device and the terminal device are located may be 1.25 KHz, 5 KHz, or another value. This is not limited in this embodiment of this application.

According to a second aspect, this application provides an information transmission method. The method includes: receiving, by a terminal device, first information from a network device, where the first information is used to indicate a first parameter to be used by the terminal device to generate a random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the parameter is at least one of 153, 137, 122, 109, 97, 85, 81, 77, 74, 71, 68, 65, 63, 60, 57, 55, 53, 51, 50, 48, 47, and 45; and generating, by the terminal device, the random access preamble sequence based on the first information.

It should be understood that, in this embodiment of this application, that the first information is used to indicate the first parameter may be understood as that the first information explicitly indicates and/or implicitly indicates the first parameter. This is not limited in this embodiment of this application.

With reference to the second aspect, in a first possible implementation of the second aspect, the method further includes: receiving, by the terminal device, second information from the network device, where the second information is used to indicate a set type to be used by the terminal device to generate the random access preamble sequence, and the set type includes an unrestricted set, a restricted set type A, or a restricted set type B; and the generating, by the terminal device, the random access preamble sequence based on the first information includes: generating, by the terminal device, the random access preamble sequence based on the first information and the second information.

It should be understood that, in this embodiment of this application, that the second information is used to indicate the set type may be understood as that the second information explicitly indicates and/or implicitly indicates the set type. This is not limited in this embodiment of this application.

With reference to the first possible implementation of the second aspect, in a second possible implementation of the second aspect, when the set type is the restricted set type A, the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

With reference to the second aspect or the first or the second possible implementation of the second aspect, in a third possible implementation of the second aspect, the method further includes: receiving, by the terminal device, third information from the network device, where the third information is used to indicate a time-frequency resource to be used by the terminal device to send the random access preamble sequence; and the generating, by the terminal device, the random access preamble sequence based on the first information includes: generating, by the terminal device, the random access preamble sequence based on the first information and the third information.

It should be understood that, in this embodiment of this application, that the third information is used to indicate the time-frequency resource may be understood as that the third information explicitly indicates and/or implicitly indicates the time-frequency resource. This is not limited in this embodiment of this application.

Optionally, a subcarrier spacing of a random access channel of a communications system in which the network device and the terminal device are located may be 1.25 KHz, 5 KHz, or another value. This is not limited in this embodiment of this application.

According to a third aspect, this application provides an information transmission method. The method includes: sending, by a network device, first information to a terminal device, where the first information is used to indicate a first parameter to be used by the terminal device to generate a random access preamble sequence, the first parameter is at least one of a plurality of values, the plurality of values correspond to different reuse factors, each of the plurality of values is a largest value in at least one value supported by a reuse factor corresponding to the value, and the reuse factor corresponding to the value indicates a quantity of cells supported by a random access preamble sequence obtained by the network device based on the value, and random access preamble sequences of adjacent cells are different.

It should be understood that, in this embodiment of this application, that the first information is used to indicate the first parameter may be understood as that the first information explicitly indicates and/or implicitly indicates the first parameter. This is not limited in this embodiment of this application.

Optionally, the first parameter may be a zero correlation zone.

According to the information transmission method provided in this embodiment of this application, the network device can configure, for the terminal device, the first parameter used to generate the random access preamble sequence, and it is ensured that for each reuse factor, a value of the zero correlation zone is the largest, to be specific, a cell coverage distance is the longest.

With reference to the third aspect, in a first possible implementation of the third aspect, the plurality of values are 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the plurality of values are 153, 137, 122, 109, 97, 85, 81, 77, 74, 71, 68, 65, 63, 60, 57, 55, 53, 51, 50, 48, 47, and 45.

According to a fourth aspect, this application provides an information transmission method. The method includes: receiving, by a terminal device, first information from a network device, where the first information is used to indicate a first parameter to be used by the terminal device to generate a random access preamble sequence, the first parameter is at least one of a plurality of values, the plurality of values correspond to different reuse factors, each of the plurality of values is a largest value in at least one value supported by a reuse factor corresponding to the value, and the reuse factor corresponding to the value indicates a quantity of cells supported by a random access preamble sequence obtained by the network device based on the value, and random access preamble sequences of adjacent cells are different; and generating, by the terminal device, the random access preamble sequence based on the first information.

It should be understood that, in this embodiment of this application, that the first information is used to indicate the first parameter may be understood as that the first information explicitly indicates and/or implicitly indicates the first parameter. This is not limited in this embodiment of this application.

Optionally, the first parameter may be a zero correlation zone.

With reference to the fourth aspect, in a first possible implementation of the fourth aspect, the plurality of values are 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the plurality of values are 153, 137, 122, 109, 97, 85, 81, 77, 74, 71, 68, 65, 63, 60, 57, 55, 53, 51, 50, 48, 47, and 45.

According to a fifth aspect, this application provides an information transmission method. The method includes: sending, by a network device, second information to a terminal device, where the second information is used to indicate a set type to be used by the terminal device to generate a random access preamble sequence, and the set type includes an unrestricted set, a restricted set type A, or a restricted set type B.

Optionally, the second information may be carried in a first field.

It should be understood that, in this embodiment of this application, that the second information is used to indicate the set type may be understood as that the second information explicitly indicates and/or implicitly indicates the set type. This is not limited in this embodiment of this application.

In an optional embodiment, the second information may explicitly indicate the set type. For example, the network device explicitly indicates, by using the first field, that the set type is the unrestricted set, the restricted set type A, or the restricted set type B.

In another optional embodiment, the second information may implicitly indicate the set type. For example, the network device sends the first field to the terminal device, where the first field is used to indicate, by indicating whether a second field is sent, whether the set type to be used by the terminal device is a first type of set or another type of set (including a second type of set and a third type of set), and when the first field indicates that the second field is sent, the second field is used to indicate that the set type is the second type of set or the third type of set.

Correspondingly, the terminal device determines, based on the first field that indicates whether the second field is sent, whether the set type is the first type of set or the another type of set (including the second type of set and the third type of set). For example, if the first field indicates that the second field is not sent, the terminal device determines that the set type is the first type of set; or if the first field indicates that the second field is sent, the terminal device determines that the set type is the another type of set. When the first field indicates that the second field is sent, the terminal device further determines, based on the second field, that the set type is the second type of set or the third type of set.

Optionally, that the first field is used to indicate, to the terminal device by indicating whether the second field is sent, whether the set type is the first type of set or the another type of set may be understood as that the first field is used to indicate, by indicating whether the terminal device receives the second field, whether the set type is the first type of set or the another type of set, or may be understood as that the first field is used to indicate, by indicating whether signaling received by the terminal device includes the second field, whether the set type is the first type of set or the another type of set. This is not limited in this embodiment of this application.

It should be understood that, the first type of set, the second type of set, and the third type of set are in a one-to-one correspondence with the unrestricted set, the restricted set type A, and the restricted set type B. However, a specific correspondence is not limited in this embodiment of this application.

Optionally, the first field and the second field may be carried in a same piece of signaling, or carried in different pieces of signaling. This is not limited in this embodiment of this application.

According to the information transmission method provided in this embodiment of this application, the network device can configure, for the terminal device by using the second information, the set type used to generate the random access preamble sequence. The set type is the unrestricted set, the restricted set type A, or the restricted set type B.

With reference to the fifth aspect, in a first possible implementation of the fifth aspect, before the sending, by a network device, second information to a terminal device, the method further includes: determining, by the network device, the set type.

With reference to the fifth aspect or the first possible implementation of the fifth aspect, in a second possible implementation of the fifth aspect, the sending, by a network device, second information to a terminal device includes: sending, by the network device, the second information to the terminal device by using first signaling.

Optionally, the first signaling may be existing signaling or newly designed signaling. This is not limited in this embodiment of this application.

According to the information transmission method provided in this embodiment of this application, the three set types can be indicated by using one piece of signaling. A signaling procedure is relatively simple, and a configuration is flexible.

With reference to the second possible implementation of the fifth aspect, in a third possible implementation of the fifth aspect, the second information is carried in a first field of the first signaling.

Optionally, when the first signaling is existing signaling, the first field may be an existing field or a newly added field in the first signaling. This is not limited in this embodiment of this application.

According to the information transmission method provided in this embodiment of this application, the three set types can be indicated to the terminal device by modifying or adding a field in the first signaling. The configuration is flexible and simple.

With reference to any one of the fifth aspect or the first to the third possible implementations of the fifth aspect, in a fourth possible implementation of the fifth aspect, the method further includes: sending, by the network device, first information to the terminal device, where the first information is used to indicate a first parameter to be used by the terminal device to generate the random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45.

It should be understood that, in this embodiment of this application, that the first information is used to indicate the first parameter may be understood as that the first information explicitly indicates and/or implicitly indicates the first parameter. This is not limited in this embodiment of this application.

With reference to any one of the fifth aspect or the first to the fourth possible implementations of the fifth aspect, in a fifth possible implementation of the fifth aspect, when the set type is the restricted set type A, the first parameter to be used by the terminal device to generate the random access preamble sequence is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

According to the information transmission method provided in this embodiment of this application, in the restricted set type A and the restricted set type B, it can be ensured that a value of a zero correlation zone corresponding to a same reuse factor is the largest, to be specific, a cell coverage distance is the longest.

With reference to any one of the fifth aspect or the first to the fifth possible implementations of the fifth aspect, in a sixth possible implementation of the fifth aspect, the method further includes: sending, by the network device, third information to the terminal device, where the third information is used to indicate a time-frequency resource to be used by the terminal device to send the random access preamble sequence.

It should be understood that, in this embodiment of this application, that the third information is used to indicate the time-frequency resource may be understood as that the third information explicitly indicates and/or implicitly indicates the time-frequency resource. This is not limited in this embodiment of this application.

Optionally, a subcarrier spacing of a random access channel of a communications system in which the network device and the terminal device are located may be 1.25 KHz, 5 KHz, or another value. This is not limited in this embodiment of this application.

According to a sixth aspect, this application provides an information transmission method. The method includes: receiving, by a terminal device, second information from a network device, where the second information is used to indicate a set type to be used by the terminal device to generate a random access preamble sequence, and the set type includes an unrestricted set, a restricted set type A, or a restricted set type B; and generating, by the terminal device, the random access preamble sequence based on the second information.

It should be understood that, in this embodiment of this application, that the second information is used to indicate the set type may be understood as that the second information explicitly indicates and/or implicitly indicates the set type. This is not limited in this embodiment of this application.

With reference to the sixth aspect, in a first possible implementation of the sixth aspect, the receiving, by a terminal device, second information from a network device includes: receiving, by the terminal device, the second information from the network device by using first signaling.

With reference to the first possible implementation of the sixth aspect, in a second possible implementation of the sixth aspect, the second information is carried in a first field of the first signaling.

With reference to the sixth aspect or the first or the second possible implementation of the sixth aspect, in a third possible implementation of the sixth aspect, the method further includes: receiving, by the terminal device, first information from the network device, where the first information is used to indicate a first parameter to be used by the terminal device to generate the random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45; and the generating, by the terminal device, the random access preamble sequence based on the second information includes: generating, by the terminal device, the random access preamble sequence based on the second information and the first information.

It should be understood that, in this embodiment of this application, that the first information is used to indicate the first parameter may be understood as that the first information explicitly indicates and/or implicitly indicates the first parameter. This is not limited in this embodiment of this application.

With reference to any one of the sixth aspect or the first to the third possible implementations of the sixth aspect, in a fourth possible implementation of the sixth aspect, when the set type is the restricted set type A, the first parameter to be used by the terminal device to generate the random access preamble sequence is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

With reference to any one of the sixth aspect or the first to the fourth possible implementations of the sixth aspect, in a fifth possible implementation of the sixth aspect, the method further includes: receiving, by the terminal device, third information from the network device, where the third information is used to indicate a time-frequency resource to be used by the terminal device to send the random access preamble sequence; and the generating, by the terminal device, the random access preamble sequence based on the second information includes: generating, by the terminal device, the random access preamble sequence based on the second information and the third information.

It should be understood that, in this embodiment of this application, that the third information is used to indicate the time-frequency resource may be understood as that the third information explicitly indicates and/or implicitly indicates the time-frequency resource. This is not limited in this embodiment of this application.

Optionally, a subcarrier spacing of a random access channel of a communications system in which the network device and the terminal device are located may be 1.25 KHz, 5 KHz, or another value. This is not limited in this embodiment of this application.

According to a seventh aspect, this application provides an information transmission apparatus, configured to perform the method according to any one of the first aspect or the possible implementations of the first aspect.

According to an eighth aspect, this application provides an information transmission apparatus, configured to perform the method according to any one of the second aspect or the possible implementations of the second aspect.

According to a ninth aspect, this application provides an information transmission apparatus, configured to perform the method according to any one of the third aspect or the possible implementations of the third aspect.

According to a tenth aspect, this application provides an information transmission apparatus, configured to perform the method according to any one of the fourth aspect or the possible implementations of the fourth aspect.

According to an eleventh aspect, this application provides an information transmission apparatus, configured to perform the method according to any one of the fifth aspect or the possible implementations of the fifth aspect.

According to a twelfth aspect, this application provides an information transmission apparatus, configured to perform the method according to any one of the sixth aspect or the possible implementations of the sixth aspect.

According to a thirteenth aspect, this application provides an information transmission apparatus. The apparatus includes a memory, a processor, a transceiver, and a computer program that is stored in the memory and that can run on the processor. When executing the computer program, the processor performs the method according to any one of the first aspect or the possible implementations of the first aspect.

According to a fourteenth aspect, this application provides an information transmission apparatus. The apparatus includes a memory, a processor, a transceiver, and a computer program that is stored in the memory and that can run on the processor. When executing the computer program, the processor performs the method according to any one of the second aspect or the possible implementations of the second aspect.

According to a fifteenth aspect, this application provides an information transmission apparatus. The apparatus includes a memory, a processor, a transceiver, and a computer program that is stored in the memory and that can run on the processor. When executing the computer program, the processor performs the method according to any one of the third aspect or the possible implementations of the third aspect.

According to a sixteenth aspect, this application provides an information transmission apparatus. The apparatus includes a memory, a processor, a transceiver, and a computer program that is stored in the memory and that can run on the processor. When executing the computer program, the processor performs the method according to any one of the fourth aspect or the possible implementations of the fourth aspect.

According to a seventeenth aspect, this application provides an information transmission apparatus. The apparatus includes a memory, a processor, a transceiver, and a computer program that is stored in the memory and that can run on the processor. When executing the computer program, the processor performs the method according to any one of the fifth aspect or the possible implementations of the fifth aspect.

According to an eighteenth aspect, this application provides an information transmission apparatus. The apparatus includes a memory, a processor, a transceiver, and a computer program that is stored in the memory and that can run on the processor. When executing the computer program, the processor performs the method according to any one of the sixth aspect or the possible implementations of the sixth aspect.

According to a nineteenth aspect, this application provides a computer-readable medium, configured to store a computer program. The computer program includes an instruction used to perform the method according to any one of the first aspect or the possible implementations of the first aspect.

According to a twentieth aspect, this application provides a computer-readable medium, configured to store a computer program. The computer program includes an instruction used to perform the method according to any one of the second aspect or the possible implementations of the second aspect.

According to a twenty-first aspect, this application provides a computer-readable medium, configured to store a computer program. The computer program includes an instruction used to perform the method according to any one of the third aspect or the possible implementations of the third aspect.

According to a twenty-second aspect, this application provides a computer-readable medium, configured to store a computer program. The computer program includes an instruction used to perform the method according to any one of the fourth aspect or the possible implementations of the fourth aspect.

According to a twenty-third aspect, this application provides a computer-readable medium, configured to store a computer program. The computer program includes an instruction used to perform the method according to any one of the fifth aspect or the possible implementations of the fifth aspect.

According to a twenty-fourth aspect, this application provides a computer-readable medium, configured to store a computer program. The computer program includes an instruction used to perform the method according to any one of the sixth aspect or the possible implementations of the sixth aspect.

According to a twenty-fifth aspect, this application provides a computer program product including an instruction. When the computer program product runs on a computer, the computer performs the method according to any one of the first aspect or the possible implementations of the first aspect.

According to a twenty-sixth aspect, this application provides a computer program product including an instruction. When the computer program product runs on a computer, the computer performs the method according to any one of the second aspect or the possible implementations of the second aspect.

According to a twenty-seventh aspect, this application provides a computer program product including an instruction. When the computer program product runs on a computer, the computer performs the method according to any one of the third aspect or the possible implementations of the third aspect.

According to a twenty-eighth aspect, this application provides a computer program product including an instruction. When the computer program product runs on a computer, the computer performs the method according to any one of the fourth aspect or the possible implementations of the fourth aspect.

According to a twenty-ninth aspect, this application provides a computer program product including an instruction. When the computer program product runs on a computer, the computer performs the method according to any one of the fifth aspect or the possible implementations of the fifth aspect.

According to a thirtieth aspect, this application provides a computer program product including an instruction. When the computer program product runs on a computer, the computer performs the method according to any one of the sixth aspect or the possible implementations of the sixth aspect.

According to a thirty-first aspect, this application provides a chip, including an input interface, an output interface, at least one processor, and a memory. The input interface, the output interface, the processor, and the memory are connected by using a bus, the processor is configured to execute code in the memory, and when the code is executed, the processor is configured to perform the method according to any one of the first aspect or the possible implementations of the first aspect.

According to a thirty-second aspect, this application provides a chip, including an input interface, an output interface, at least one processor, and a memory. The input interface, the output interface, the processor, and the memory are connected by using a bus, the processor is configured to execute code in the memory, and when the code is executed, the processor is configured to perform the method according to any one of the second aspect or the possible implementations of the second aspect.

According to a thirty-third aspect, this application provides a chip, including an input interface, an output interface, at least one processor, and a memory. The input interface, the output interface, the processor, and the memory are connected by using a bus, the processor is configured to execute code in the memory, and when the code is executed, the processor is configured to perform the method according to any one of the third aspect or the possible implementations of the third aspect.

According to a thirty-fourth aspect, this application provides a chip, including an input interface, an output interface, at least one processor, and a memory. The input interface, the output interface, the processor, and the memory are connected by using a bus, the processor is configured to execute code in the memory, and when the code is executed, the processor is configured to perform the method according to any one of the fourth aspect or the possible implementations of the fourth aspect.

According to a thirty-fifth aspect, this application provides a chip, including an input interface, an output interface, at least one processor, and a memory. The input interface, the output interface, the processor, and the memory are connected by using a bus, the processor is configured to execute code in the memory, and when the code is executed, the processor is configured to perform the method according to any one of the fifth aspect or the possible implementations of the fifth aspect.

According to a thirty-sixth aspect, this application provides a chip, including an input interface, an output interface, at least one processor, and a memory. The input interface, the output interface, the processor, and the memory are connected by using a bus, the processor is configured to execute code in the memory, and when the code is executed, the processor is configured to perform the method according to any one of the sixth aspect or the possible implementations of the sixth aspect.

DETAILED DESCRIPTION OF ILLUSTRATIVE EMBODIMENTS

The following describes technical solutions of this application with reference to the accompanying drawings.

It should be understood that, the technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), an LTE system, an LTE frequency division duplex (FDD) system, LTE time division duplex (TDD) system, a universal mobile telecommunication system (UMTS), a worldwide interoperability for microwave access (WiMAX) communications system, a wireless local area network (WLAN), a future 5th generation (5G) system, or new radio (NR).

Figure 1:
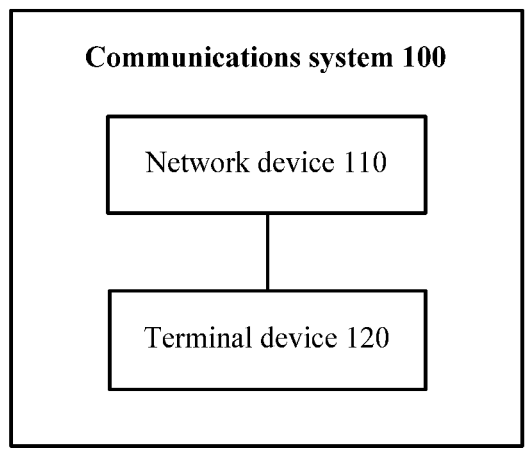
FIG. 1 is a schematic architectural diagram of a communications system according to an embodiment of this application.

FIG. 1 is a schematic architectural diagram of a communications system 100 according to an embodiment of this application. As shown in FIG. 1, the communications system 100 may include at least one network device (FIG. 1 shows a network device 110) and at least one terminal device (FIG. 1 shows a terminal device 120), and the at least one network device may perform wireless communication with the at least one terminal device.

FIG. 1 shows one network device and one terminal device as an example. Optionally, the communications system 100 may include a plurality of network devices, and a coverage area of each network device may include another quantity of terminal devices. This is not limited in this embodiment of the present invention. Optionally, the communications system 100 may further include another network entity such as a network controller or a mobility management entity. This is not limited in this embodiment of this application.

Optionally, the network device may provide communication coverage for a particular geographical area, and may communicate with UE located in the coverage area. The network device may be a base transceiver station (BTS) in a GSM system or a CDMA system, or may be a NodeB (NB) in a WCDMA system, or may be an evolved NodeB (eNB or eNodeB) in an LTE system, or may be a radio controller in a cloud radio access network (CRAN). The network device may alternatively be a core network, a relay station, an access point, an in-vehicle device, a wearable device, a network side device in a future 5G network, a network device in a future evolved public land mobile network (PLMN), or the like.

Optionally, the terminal device may be movable or fixed. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, an in-vehicle device, a wearable device, a terminal device in a future 5G network, a terminal device in a future evolved PLMN, or the like.

In an LTE system, the network device 110 is configured to send information used to generate a random access preamble sequence to the terminal device 120. The terminal device 120 is configured to: receive the information from the network device 110, generate the random access preamble sequence based on the information, and send the random access preamble sequence to the network device 110, to access the network device.

It should be understood that, the random access preamble sequence in this embodiment of this application may be understood as a preamble sequence to be used by the terminal device for random access.

Optionally, the information used to generate the random access preamble sequence may include a zero correlation zone, a set type used to generate the random access preamble sequence, and the like. This is not limited in this embodiment of this application.

Optionally, the set type may include an unrestricted set, a restricted set type A, or a restricted set type B. This is not limited in this embodiment of this application.

It should be understood that, the zero correlation zone is an important parameter required in a process of generating the random access preamble sequence.

It should be further understood that, different set types correspond to different random access preamble sequence generation methods.

Table 1 shows values ($N_{cs}$) correspond to the zero correlation zone configurations when the three set types are used to generate the random access preamble sequence:

TABLE 1

| Zero correlation zone configuration (zero correlation zone config) | $N_{CS}$ | | |
|---|---|---|---|
| | Unrestricted set | Restricted set type A | Restricted set type B |
| 0 | 0 | 15 | 15 |
| 1 | 13 | 18 | 18 |
| 2 | 15 | 22 | 22 |
| 3 | 18 | 26 | 26 |
| 4 | 22 | 32 | 32 |
| 5 | 26 | 38 | 38 |
| 6 | 32 | 46 | 46 |
| 7 | 38 | 55 | 55 |
| 8 | 46 | 68 | 68 |
| 9 | 59 | 82 | 82 |
| 10 | 76 | 100 | 100 |
| 11 | 93 | 128 | 118 |
| 12 | 119 | 158 | 137 |
| 13 | 167 | 202 | — |
| 14 | 279 | 237 | — |
| 15 | 419 | — | — |

For example, the network device instructs the terminal device to generate the random access preamble sequence by using the restricted set type A, and the network device further indicates that when a value of a zero correlation zone configuration parameter to be used by the terminal device is 1, the terminal device can generate the random access preamble sequence by using Ncs=18 (as indicated by using a bold font with an underline in Table 1) and a random access preamble sequence generation method corresponding to the restricted set type A.

It should be understood that, in the LTE system, a subcarrier spacing of a physical random access channel (PRACH) is 1.25 KHz (kilohertz), and a length of an orthogonal frequency division multiplexing (OFDM) symbol of the PRACH whose subcarrier spacing is 1.25 KHz (which is briefly referred to as an X format and may include a plurality of sub-formats) is 800 milliseconds.

It should be further understood that, the length of the OFDM symbol of the PRACH in this embodiment of this application does not include a cyclic prefix (CP).

Table 2 shows a correspondence between a zero correlation zone and cell coverage (to be specific, a cell radius) in the X format. It can be learned from Table 2 that larger value of $N_{cs}$ indicates wider cell coverage.

TABLE 2

| Unrestricted set | | Restricted set type A | | Restricted set type B | |
|---|---|---|---|---|---|
| Ncs | Cell coverage distance (meter) | Ncs | Cell coverage distance (meter) | Ncs | Cell coverage distance (meter) |
| | | 15.00 | 1157.36 | 15.00 | 1157.36 |
| 13.00 | 871.30 | 18.00 | 1586.44 | 18.00 | 1586.44 |
| 15.00 | 1157.36 | 22.00 | 2158.55 | 22.00 | 2158.55 |
| 18.00 | 1586.44 | 26.00 | 2730.66 | 26.00 | 2730.66 |
| 22.00 | 2158.55 | 32.00 | 3588.82 | 32.00 | 3588.82 |
| 26.00 | 2730.66 | 38.00 | 4446.99 | 38.00 | 4446.99 |
| 32.00 | 3588.82 | 46.00 | 5591.21 | 46.00 | 5591.21 |
| 38.00 | 4446.99 | 55.00 | 6878.45 | 55.00 | 6878.45 |
| 46.00 | 5591.21 | 68.00 | 8737.81 | 68.00 | 8737.81 |
| 59.00 | 7450.56 | 82.00 | 10740.19 | 82.00 | 10740.19 |
| 76.00 | 9882.03 | 100.00 | 13314.69 | 100.00 | 13314.69 |
| 93.00 | 12313.49 | 128.00 | 17319.45 | 118.00 | 15889.18 |
| 119.00 | 16032.21 | 158.00 | 21610.28 | 137.00 | 18606.70 |
| 167.00 | 22897.52 | 202.00 | 27903.48 | — | — |
| 279.00 | 38916.59 | 237.00 | 32909.44 | — | — |

However, with continuous development of communications technologies and increasingly high requirements of users for a transmission rate and transmission performance, in an NR system, a PRACH whose subcarrier spacing is 5 KHz (which is briefly referred to as a Y forma and may include a plurality of sub-formats) is provided, and a length of an OFDM symbol of the PRACH whose subcarrier spacing is 5 KHz is 200 milliseconds.

Table 3 shows a correspondence between Ncs and cell coverage in the Y format, where the correspondence is obtained by configuring $N_{cs}$ in the Y format based on $N_{cs}$ in the X format.

TABLE 3

| Unrestricted set | | Restricted set type A | | Restricted set type B | |
|---|---|---|---|---|---|
| Ncs | Cell coverage distance (meter) | Ncs | Cell coverage distance (meter) | Ncs | Cell coverage distance (meter) |
| — | — | 15.00 | — | 15.00 | — |
| 13.00 | — | 18.00 | — | 18.00 | — |
| 15.00 | — | 22.00 | 13.14 | 22.00 | 13.14 |
| 18.00 | — | 26.00 | 156.16 | 26.00 | 156.16 |
| 22.00 | 13.14 | 32.00 | 370.71 | 32.00 | 370.71 |
| 26.00 | 156.16 | 38.00 | 585.25 | 38.00 | 585.25 |
| 32.00 | 370.71 | 46.00 | 871.30 | 46.00 | 871.30 |
| 38.00 | 585.25 | 55.00 | 1193.11 | 55.00 | 1193.11 |
| 46.00 | 871.30 | 68.00 | 1657.95 | 68.00 | 1657.95 |
| 59.00 | 1336.14 | 82.00 | 2158.55 | 82.00 | 2158.55 |
| 76.00 | 1944.01 | 100.00 | 2802.17 | 100.00 | 2802.17 |
| 93.00 | 2551.87 | 128.00 | 3803.36 | 118.00 | 3445.79 |
| 119.00 | 3481.55 | 158.00 | 4876.07 | 137.00 | 4125.18 |
| 167.00 | 5197.88 | 202.00 | 6449.37 | — | — |
| 279.00 | 9202.65 | 237.00 | 7700.86 | — | — |

It can be learned based on Table 2 and Table 3 that, cell coverage in the X format is different from cell coverage in the Y format for same $N_{cs}$ value, and a cell coverage radius in the Y format that is obtained through calculation by configuring values of $N_{cs}$ in the Y format based on some values of $N_{cs}$ in the X format is too small.

For example, in Table 2, in the X format, when $N_{cs}$ is 22 and the set type is the unrestricted set, cell coverage is 2158.55 (as indicated by using a bold font with an underline in Table 2). However, in the Y format, when $N_{cs}$ is 22 and the set type is the unrestricted set, cell coverage is only 13.14 (as indicated by using a bold font with an underline in Table 3).

The LTE system supports 16 values of $N_{cs}$ configurations. Therefore, excluding $N_{cs}$ configurations in which cell coverage is too small in the Y format from n the $N_{cs}$ configurations in the X format, a number of $N_{cs}$ configurations that can be used is few.

In conclusion, not all Ncs configurations in the existing X format are applicable to the Y format, so that a new $N_{cs}$ configuration needs to be provided, to satisfy different subcarrier spacings applicable to the PRACH in the NR system.

An embodiment of this application provides an information transmission method, to configure, for a terminal device, information used to generate a random access preamble sequence. It should be understood that, the information used to generate the random access preamble sequence includes $N_{cs}$.

Figure 2:
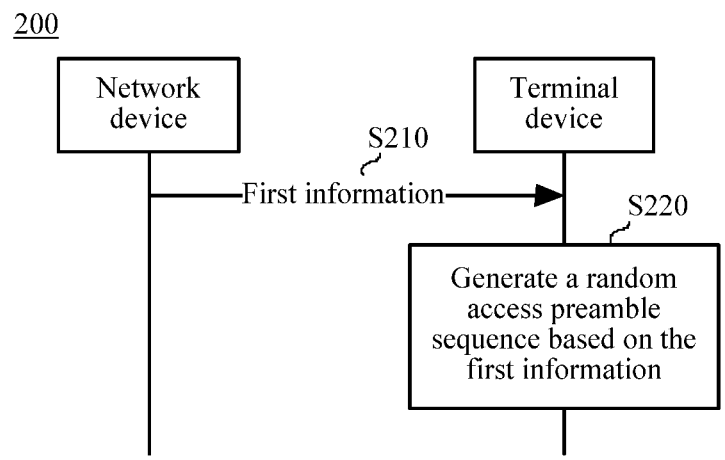
FIG. 2 is a schematic flowchart of an information transmission method according to an embodiment of this application.

FIG. 2 is a schematic flowchart of an information transmission method 200 according to an embodiment of this application. The method 200 can be applied to the communications system shown in FIG. 1.

S210. The network device sends first information to the terminal device, where the first information is used to indicate a first parameter to be used by the terminal device to generate a random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45; and correspondingly, the terminal device receives the first information from the network device.

S220. The terminal device generates the random access preamble sequence based on the first information.

It should be understood that, the first parameter may be a zero correlation zone, and a value of the first parameter may be a value of $N_{cs}$ in the embodiments of this application.

Optionally, before S210, the network device may first determine the first parameter.

Optionally, in S220, the generating, by the terminal device, the random access preamble sequence based on the first information may be determining, by the terminal device, the first parameter based on the first information, and generating the random access preamble sequence based on the first parameter.

Optionally, that the first information is used to indicate the first parameter may be understood as that the first information includes the first parameter, or that the first information is indication information used to indicate the first parameter. This is not limited in this embodiment of this application.

According to the information transmission method provided in this embodiment of this application, the network device can configure, for the terminal device, the first parameter used to generate the random access preamble sequence, and it is ensured that for each reuse factor (reuse factor), a value of the zero correlation zone is the largest, to be specific, a cell coverage distance is the longest.

It should be understood that, a total of 838 root sequences used to generate the random access preamble sequence are defined in an LTE system. For a same root sequence, different quantities of random access preamble sequences are obtained based on different $N_{cs}$. For a same root sequence and same $N_{cs}$, different quantities of random access preamble sequences are obtained based on generation methods corresponding to different set types.

Table 4 shows a correspondence between $N_{cs}$ and a quantity of random access preamble sequences that can be generated based on the 838 root sequences when the random access preamble sequence is generated by using a generation method corresponding to a restricted set type A.

As shown in Table 4, M indicates the quantity of random access preamble sequences, N indicates a quantity of reuse factors, and $N_{cs}$ indicates the zero correlation zone.

TABLE 4

| $N_{CS}$ | M | N |
|---|---|---|
| 5 | 37428 | 584 |
| 6 | 30826 | 481 |
| 7 | 26264 | 410 |
| 8 | 22686 | 354 |
| 9 | 20100 | 314 |
| 10 | 17890 | 279 |
| 11 | 16190 | 252 |
| 12 | 14646 | 228 |
| 13 | 13514 | 211 |
| 14 | 12366 | 193 |
| 15 | 11496 | 179 |
| 16 | 10672 | 166 |
| 17 | 10018 | 156 |
| 18 | 9340 | 145 |
| 19 | 8800 | 137 |
| 20 | 8258 | 129 |
| 21 | 7878 | 123 |
| 22 | 7440 | 116 |
| 23 | 7062 | 110 |
| 24 | 6682 | 104 |
| 25 | 6398 | 99 |
| 26 | 6108 | 95 |
| 27 | 5868 | 91 |
| 28 | 5582 | 87 |
| 29 | 5354 | 83 |
| 30 | 5120 | 80 |
| 31 | 4926 | 76 |
| 32 | 4738 | 74 |
| 33 | 4588 | 71 |
| 34 | 4416 | 69 |
| 35 | 4252 | 66 |
| 36 | 4098 | 64 |
| 37 | 3976 | 62 |
| 38 | 3836 | 59 |
| 39 | 3722 | 58 |
| 40 | 3578 | 55 |
| 41 | 3496 | 54 |
| 42 | 3388 | 52 |
| 43 | 3288 | 51 |
| 44 | 3162 | 49 |
| 45 | 3064 | 47 |
| 46 | 2952 | 46 |
| 47 | 2864 | 44 |
| 48 | 2788 | 43 |
| 49 | 2728 | 42 |
| 50 | 2656 | 41 |
| 51 | 2610 | 40 |
| 52 | 2548 | 39 |
| 53 | 2498 | 39 |
| 54 | 2434 | 38 |
| 55 | 2384 | 37 |
| 56 | 2316 | 36 |
| 57 | 2270 | 35 |
| 58 | 2208 | 34 |
| 59 | 2158 | 33 |
| 60 | 2096 | 32 |
| 61 | 2052 | 32 |

TABLE 4-continued

| $N_{CS}$ | M | N |
|---|---|---|
| 62 | 1996 | 31 |
| 63 | 1950 | 30 |
| 64 | 1894 | 29 |
| 65 | 1850 | 28 |
| 66 | 1792 | 28 |
| 67 | 1748 | 27 |
| 68 | 1690 | 26 |
| 69 | 1648 | 25 |
| 70 | 1590 | 24 |
| 71 | 1568 | 24 |
| 72 | 1538 | 24 |
| 73 | 1518 | 23 |
| 74 | 1488 | 23 |
| 75 | 1466 | 22 |
| 76 | 1434 | 22 |
| 77 | 1418 | 22 |
| 78 | 1396 | 21 |
| 79 | 1382 | 21 |
| 80 | 1360 | 21 |
| 81 | 1346 | 21 |
| 82 | 1324 | 20 |
| 83 | 1310 | 20 |
| 84 | 1288 | 20 |
| 85 | 1266 | 19 |
| 86 | 1236 | 19 |
| 87 | 1214 | 18 |
| 88 | 1182 | 18 |
| 89 | 1162 | 18 |
| 90 | 1130 | 17 |
| 91 | 1108 | 17 |
| 92 | 1078 | 16 |
| 93 | 1056 | 16 |
| 94 | 1032 | 16 |
| 95 | 1022 | 15 |
| 96 | 1004 | 15 |
| 97 | 992 | 15 |
| 98 | 976 | 15 |
| 99 | 964 | 15 |
| 100 | 946 | 14 |
| 101 | 936 | 14 |
| 102 | 918 | 14 |
| 103 | 906 | 14 |
| 104 | 890 | 13 |
| 105 | 878 | 13 |
| 106 | 860 | 13 |
| 107 | 850 | 13 |
| 108 | 832 | 13 |
| 109 | 820 | 12 |
| 110 | 804 | 12 |
| 111 | 792 | 12 |
| 112 | 774 | 12 |
| 113 | 764 | 11 |
| 114 | 746 | 11 |
| 115 | 734 | 11 |
| 116 | 718 | 11 |
| 117 | 706 | 11 |
| 118 | 688 | 10 |
| 119 | 678 | 10 |
| 120 | 660 | 10 |
| 121 | 650 | 10 |
| 122 | 636 | 9 |
| 123 | 626 | 9 |
| 124 | 612 | 9 |
| 125 | 602 | 9 |
| 126 | 588 | 9 |
| 127 | 578 | 9 |
| 128 | 564 | 8 |
| 129 | 554 | 8 |
| 130 | 540 | 8 |
| 131 | 530 | 8 |
| 132 | 516 | 8 |
| 133 | 506 | 7 |
| 134 | 492 | 7 |
| 135 | 482 | 7 |
| 136 | 468 | 7 |
| 137 | 458 | 7 |
| 138 | 444 | 6 |
| 139 | 434 | 6 |
| 140 | 420 | 6 |
| 141 | 418 | 6 |
| 142 | 414 | 6 |
| 143 | 412 | 6 |
| 144 | 408 | 6 |
| 145 | 406 | 6 |
| 146 | 402 | 6 |
| 147 | 400 | 6 |
| 148 | 396 | 6 |
| 149 | 394 | 6 |
| 150 | 390 | 6 |
| 151 | 388 | 6 |
| 152 | 384 | 6 |
| 153 | 382 | 5 |
| 154 | 378 | 5 |
| 155 | 376 | 5 |
| 156 | 372 | 5 |
| 157 | 370 | 5 |
| 158 | 366 | 5 |
| 159 | 364 | 5 |
| 160 | 360 | 5 |
| 161 | 358 | 5 |
| 162 | 354 | 5 |
| 163 | 352 | 5 |
| 164 | 348 | 5 |
| 165 | 346 | 5 |
| 166 | 342 | 5 |
| 167 | 340 | 5 |
| 168 | 336 | 5 |
| 169 | 334 | 5 |
| 170 | 330 | 5 |
| 171 | 328 | 5 |
| 172 | 324 | 5 |
| 173 | 322 | 5 |
| 174 | 318 | 4 |
| 175 | 316 | 4 |
| 176 | 312 | 4 |
| 177 | 310 | 4 |
| 178 | 306 | 4 |
| 179 | 304 | 4 |
| 180 | 300 | 4 |
| 181 | 298 | 4 |
| 182 | 294 | 4 |
| 183 | 292 | 4 |
| 184 | 288 | 4 |
| 185 | 286 | 4 |
| 186 | 282 | 4 |
| 187 | 280 | 4 |
| 188 | 276 | 4 |
| 189 | 274 | 4 |
| 190 | 270 | 4 |
| 191 | 268 | 4 |
| 192 | 264 | 4 |
| 193 | 262 | 4 |
| 194 | 258 | 4 |
| 195 | 256 | 4 |
| 196 | 252 | 3 |
| 197 | 250 | 3 |
| 198 | 246 | 3 |
| 199 | 244 | 3 |
| 200 | 240 | 3 |
| 201 | 238 | 3 |
| 202 | 234 | 3 |
| 203 | 232 | 3 |
| 204 | 228 | 3 |
| 205 | 226 | 3 |
| 206 | 222 | 3 |
| 207 | 220 | 3 |
| 208 | 216 | 3 |
| 209 | 214 | 3 |
| 210 | 210 | 3 |
| 211 | 208 | 3 |
| 212 | 204 | 3 |
| 213 | 202 | 3 |
| 214 | 198 | 3 |
| 215 | 196 | 3 |
| 216 | 192 | 3 |
| 217 | 190 | 2 |

TABLE 4-continued

| $N_{CS}$ | M | N |
|---|---|---|
| 218 | 186 | 2 |
| 219 | 184 | 2 |
| 220 | 180 | 2 |
| 221 | 178 | 2 |
| 222 | 174 | 2 |
| 223 | 172 | 2 |
| 224 | 168 | 2 |
| 225 | 166 | 2 |
| 226 | 162 | 2 |
| 227 | 160 | 2 |
| 228 | 156 | 2 |
| 229 | 154 | 2 |
| 230 | 150 | 2 |
| 231 | 148 | 2 |
| 232 | 144 | 2 |
| 233 | 142 | 2 |
| 234 | 138 | 2 |
| 235 | 136 | 2 |
| 236 | 132 | 2 |
| 237 | 130 | 2 |
| 238 | 126 | 1 |
| — | — | — |

It should be understood that, the reuse factor provided in this embodiment of this application may be understood as a quantity of cells supported by the random access preamble sequence obtained based on $N_{cs}$.

For example, as indicated by using a bold font with a straight underline in Table 4, for Ncs=195, when the random access preamble sequence is generated by using the generation method corresponding to the restricted set type A, 256 random access preamble sequences can be obtained. To avoid inter-cell interference, different random access preamble sequences may be used in adjacent cells as far as possible. When each PRACH time-frequency resource in each cell supports 64 random access preamble sequences, the 256 random access preamble sequences can serve a maximum of four (256/64=4) cells, to be specific, the reuse factor is 4. Therefore, in an actual network deployment, terminal devices in the four cells may access the network device by using different random access preamble sequences.

For another example, as indicated by using a bold font with a wavy underline in Table 4, for Ncs=174, when the random access preamble sequence is generated by using the generation method corresponding to the restricted set type A, 318 random access preamble sequences can be obtained. To avoid inter-cell interference, different random access preamble sequences may be used in adjacent cells as far as possible. When each PRACH time-frequency resource in each cell supports 64 random access preamble sequences, the 318 random access preamble sequences can serve a maximum of four (318/64=4 with a remainder 62) cells, to be specific, the reuse factor is 4. Therefore, in an actual network deployment, terminal devices in the four cells may access the network device by using different random access preamble sequences.

Table 5 shows a correspondence between $N_{cs}$ and a quantity of random access preamble sequences that can be generated based on the 838 root sequences when the random access preamble sequence is generated by using a generation method corresponding to a restricted set type B.

As shown in Table 5, M indicates the quantity of random access preamble sequences, N indicates a quantity of reuse factors, and $N_{cs}$ indicates the zero correlation zone.

TABLE 5

| $N_{CS}$ | M | N |
|---|---|---|
| 5 | 21302 | 332 |
| 6 | 17372 | 271 |
| 7 | 14796 | 231 |
| 8 | 12698 | 198 |
| 9 | 11196 | 174 |
| 10 | 9914 | 154 |
| 11 | 8928 | 139 |
| 12 | 8038 | 125 |
| 13 | 7366 | 115 |
| 14 | 6694 | 104 |
| 15 | 6230 | 97 |
| 16 | 5750 | 89 |
| 17 | 5342 | 83 |
| 18 | 4960 | 77 |
| 19 | 4682 | 73 |
| 20 | 4372 | 68 |
| 21 | 4110 | 64 |
| 22 | 3888 | 60 |
| 23 | 3708 | 57 |
| 24 | 3456 | 54 |
| 25 | 3300 | 51 |
| 26 | 3112 | 48 |
| 27 | 2964 | 46 |
| 28 | 2796 | 43 |
| 29 | 2692 | 42 |
| 30 | 2584 | 40 |
| 31 | 2506 | 39 |
| 32 | 2382 | 37 |
| 33 | 2288 | 35 |
| 34 | 2186 | 34 |
| 35 | 2108 | 32 |
| 36 | 2006 | 31 |
| 37 | 1938 | 30 |
| 38 | 1842 | 28 |
| 39 | 1772 | 27 |
| 40 | 1694 | 26 |
| 41 | 1628 | 25 |
| 42 | 1542 | 24 |
| 43 | 1508 | 23 |
| 44 | 1458 | 22 |
| 45 | 1426 | 22 |
| 46 | 1390 | 21 |
| 47 | 1360 | 21 |
| 48 | 1300 | 20 |
| 49 | 1274 | 19 |
| 50 | 1224 | 19 |
| 51 | 1188 | 18 |
| 52 | 1148 | 17 |
| 53 | 1118 | 17 |
| 54 | 1072 | 16 |
| 55 | 1040 | 16 |
| 56 | 994 | 15 |
| 57 | 976 | 15 |
| 58 | 952 | 14 |
| 59 | 936 | 14 |
| 60 | 906 | 14 |
| 61 | 890 | 13 |
| 62 | 860 | 13 |
| 63 | 840 | 13 |
| 64 | 814 | 12 |
| 65 | 792 | 12 |
| 66 | 764 | 11 |
| 67 | 748 | 11 |
| 68 | 722 | 11 |
| 69 | 700 | 10 |
| 70 | 676 | 10 |
| 71 | 658 | 10 |
| 72 | 626 | 9 |
| 73 | 612 | 9 |
| 74 | 586 | 9 |
| 75 | 564 | 8 |
| 76 | 540 | 8 |
| 77 | 522 | 8 |
| 78 | 500 | 7 |
| 79 | 486 | 7 |
| 80 | 466 | 7 |
| 81 | 448 | 7 |
| 82 | 430 | 6 |

TABLE 5-continued

| $N_{CS}$ | M | N |
| --- | --- | --- |
| 83 | 416 | 6 |
| 84 | 392 | 6 |
| 85 | 390 | 6 |
| 86 | 382 | 5 |
| 87 | 378 | 5 |
| 88 | 372 | 5 |
| 89 | 368 | 5 |
| 90 | 360 | 5 |
| 91 | 358 | 5 |
| 92 | 350 | 5 |
| 93 | 346 | 5 |
| 94 | 340 | 5 |
| 95 | 336 | 5 |
| 96 | 328 | 5 |
| 97 | 326 | 5 |
| 98 | 318 | 4 |
| 99 | 314 | 4 |
| 100 | 308 | 4 |
| 101 | 304 | 4 |
| 102 | 296 | 4 |
| 103 | 294 | 4 |
| 104 | 286 | 4 |
| 105 | 282 | 4 |
| 106 | 276 | 4 |
| 107 | 272 | 4 |
| 108 | 264 | 4 |
| 109 | 262 | 4 |
| 110 | 254 | 3 |
| 111 | 250 | 3 |
| 112 | 244 | 3 |
| 113 | 240 | 3 |
| 114 | 232 | 3 |
| 115 | 230 | 3 |
| 116 | 222 | 3 |
| 117 | 218 | 3 |
| 118 | 212 | 3 |
| 119 | 208 | 3 |
| 120 | 200 | 3 |
| 121 | 198 | 3 |
| 122 | 192 | 3 |
| 123 | 190 | 2 |
| 124 | 184 | 2 |
| 125 | 180 | 2 |
| 126 | 176 | 2 |
| 127 | 174 | 2 |
| 128 | 166 | 2 |
| 129 | 164 | 2 |
| 130 | 160 | 2 |
| 131 | 156 | 2 |
| 132 | 150 | 2 |
| 133 | 148 | 2 |
| 134 | 142 | 2 |
| 135 | 140 | 2 |
| 136 | 134 | 2 |
| 137 | 130 | 2 |
| 138 | 126 | 1 |
| 139 | 124 | 1 |
| 140 | 116 | 1 |
| 141 | 114 | 1 |
| 142 | 110 | 1 |
| 143 | 106 | 1 |
| 144 | 100 | 1 |
| 145 | 98 | 1 |
| 146 | 92 | 1 |
| 147 | 90 | 1 |
| 148 | 84 | 1 |
| 149 | 80 | 1 |
| 150 | 76 | 1 |
| 151 | 74 | 1 |
| 152 | 66 | 1 |
| 153 | 64 | 1 |
| 154 | 60 | 0 |

For example, as indicated by using a bold font with a straight underline in Table 5, for Ncs=109, when the random access preamble sequence is generated by using the generation method corresponding to the restricted set type B, 262 random access preamble sequences can be obtained. To avoid inter-cell interference, different random access preamble sequences may be used in adjacent cells as far as possible. When each PRACH time-frequency resource in each cell supports 64 random access preamble sequences, the 262 random access preamble sequences can serve a maximum of four (262/64=4 with a remainder 6) cells, to be specific, the reuse factor is 4. Therefore, in an actual network deployment, terminal devices in the four cells may access the network device by using different random access preamble sequences.

For another example, as indicated by using a bold font with a wavy underline in Table 5, for Ncs=98, when the random access preamble sequence is generated by using the generation method corresponding to the restricted set type B, 318 random access preamble sequences can be obtained. To avoid inter-cell interference, different random access preamble sequences may be used in adjacent cells as far as possible. When each PRACH time-frequency resource in each cell supports 64 random access preamble sequences, the 318 random access preamble sequences can serve a maximum of four (318/64=4 with a remainder 62) cells, to be specific, the reuse factor is 4. Therefore, in an actual network deployment, terminal devices in the four cells may access the network device by using different random access preamble sequences.

It can be learned from Table 4 and Table 5 that different Ncs corresponds to different cell coverage and different quantities of generated random access preamble sequences. However, different $N_{cs}$ may correspond to a same reuse factor.

To be specific, a same reuse factor may support one or more $N_{cs}$. A plurality of $N_{cs}$ correspond to different cell coverage and different quantities of random access preamble sequences that can be generated.

According to the information transmission method provided in this embodiment of this application, $N_{cs}$ that corresponds to widest cell coverage in one or more $N_{cs}$ corresponding to a same reuse factor is used as the first parameter to be used by the terminal device to generate the random access preamble sequence, the first information is sent to the terminal device, and the first information is used to indicate the first parameter.

To be specific, for a same reuse factor, a largest value in one or more $N_{cs}$ corresponding to the reuse factor is selected, to ensure that cell coverage corresponding to $N_{cs}$ is the widest.

For example, as shown in Table 4, for the restricted set type A, $N_{cs}$ supported by the reuse factor 4 includes 174, 175, . . . , and 195. It can be learned, according to a principle that larger $N_{cs}$ indicates wider cell coverage, that for the reuse factor 4, when $N_{cs}$ is 195, cell coverage is the widest.

Therefore, to maximize cell coverage for a same reuse factor, for the restricted set type A, when the reuse factor is 4, Ncs=195.

Similarly, for the restricted set type A, when the reuse factor is 1, $N_{cs}$=238; when the reuse factor is 2, $N_{cs}$=237; when the reuse factor is 3, $N_{cs}$=216; when the reuse factor is 4, $N_{cs}$=195; when the reuse factor is 5, $N_{cs}$=173; when the reuse factor is 6, $N_{cs}$=152; when the reuse factor is 7, $N_{cs}$=137; when the reuse factor is 8, $N_{cs}$=132; when the reuse factor is 9, $N_{cs}$=127; when the reuse factor is 10, $N_{cs}$=121; when the reuse factor is 11, $N_{cs}$=117; when the reuse factor is 12, $N_{cs}$=112; when the reuse factor is 13, $N_{cs}$=108; when the reuse factor is 14, $N_{cs}$=103; when the reuse factor is 15, $N_{cs}$=99; when the reuse factor is 16, $N_{cs}$=94; when the reuse factor is 17, $N_{cs}$=91; when the reuse factor is 18, $N_{cs}$=89; when the reuse factor is 19, $N_{cs}$=86; when the reuse factor is 20, $N_{cs}$=84; when the reuse factor is 21, $N_{cs}$=81; when the reuse factor is 22, $N_{cs}$=77; when the reuse factor is 23, $N_{cs}$=74; when the reuse factor is 24, $N_{cs}$=72; when the reuse factor is 25, $N_{cs}$=69; when the reuse factor is 26, $N_{cs}$=68; when the reuse factor is 27, $N_{cs}$=67; when the reuse factor is 28, $N_{cs}$=66; when the reuse factor is 29, $N_{cs}$=64; when the reuse factor is 30, $N_{cs}$=63; when the reuse factor is 31, $N_{cs}$=62; when the reuse factor is 32, $N_{cs}$=61; when the reuse factor is 33, $N_{cs}$=59; when the reuse factor is 34, $N_{cs}$=58; when the reuse factor is 35, $N_{cs}$=57; when the reuse factor is 36, $N_{cs}$=56, and so on.

For another example, as shown in Table 5, for the restricted set type B, $N_{cs}$ supported by the reuse factor 4 includes 98, 99, . . . , and 109. It can be learned, according to the principle that larger $N_{cs}$ indicates wider cell coverage, that for the reuse factor 4, when $N_{cs}$ is 109, cell coverage is the widest.

Therefore, to maximize cell coverage for a same reuse factor, for the restricted set type B, when the reuse factor is 4, Ncs=109.

Similarly, for the restricted set type B, when the reuse factor is 1, $N_{cs}$=153; when the reuse factor is 2, $N_{cs}$=137; when the reuse factor is 3, $N_{cs}$=122; when the reuse factor is 4, $N_{cs}$=109; when the reuse factor is 5, $N_{cs}$=97; when the reuse factor is 6, $N_{cs}$=85; when the reuse factor is 7, $N_{cs}$=81; when the reuse factor is 8, $N_{cs}$=77; when the reuse factor is 9, $N_{cs}$=74; when the reuse factor is 10, $N_{cs}$=71; when the reuse factor is 11, $N_{cs}$=68; when the reuse factor is 12, $N_{cs}$=65; when the reuse factor is 13, $N_{cs}$=63; when the reuse factor is 14, $N_{cs}$=60; when the reuse factor is 15, $N_{cs}$=57; when the reuse factor is 16, $N_{cs}$=55; when the reuse factor is 17, $N_{cs}$=53; when the reuse factor is 18, $N_{cs}$=51; when the reuse factor is 19, $N_{cs}$=50; when the reuse factor is 20, $N_{cs}$=48; when the reuse factor is 21, $N_{cs}$=47; when the reuse factor is 22, $N_{cs}$=45; when the reuse factor is 23, $N_{cs}$=43; when the reuse factor is 24, $N_{cs}$=42; when the reuse factor is 25, $N_{cs}$=41; when the reuse factor is 26, $N_{cs}$=40; when the reuse factor is 27, $N_{cs}$=39, and so on.

Therefore, in this embodiment of this application, the first parameter may be at least one of a plurality of values, the plurality of values correspond to different reuse factors, each of the plurality of values is a largest value in at least one value supported by a reuse factor corresponding to the value, and the reuse factor corresponding to the value indicates a quantity of cells supported by a random access preamble sequence obtained by the network device based on the value, and random access preamble sequences of adjacent cells are different.

Optionally, the plurality of values are 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the plurality of values are 153, 137, 122, 109, 97, 85, 81, 77, 74, 71, 68, 65, 63, 60, 57, 55, 53, 51, 50, 48, 47, 45, 43, 42, 41, 40, and 39.

It should be understood that in this embodiment of this application, the plurality of values are not limited to the foregoing values that satisfy a condition and that are listed as examples, and may alternatively be other values satisfying the condition in the table, and the other values are not listed one by one in this application.

Optionally, the plurality of values in this embodiment of this application may alternatively be other values in Table 4 or Table 5. This is not limited in this embodiment of this application.

It should be further understood that, Table 4 and Table 5 show only example correspondences between the reuse factor and $N_{cs}$ for the restricted set type A and the restricted set type B. There may further be other correspondences between the reuse factor and $N_{cs}$, and in the other correspondences, provided that a condition in which selected $N_{cs}$ is a largest value corresponding to a same reuse factor is satisfied, the selected $N_{cs}$ can belong to the plurality of values in this embodiment of this application. This is not limited in this embodiment of this application.

It should be further understood that, the network device and the terminal device may agree on the plurality of values by using a protocol, or the network device may indicate the plurality of values to the terminal device by using high layer signaling. This is not limited in this embodiment of this application.

Optionally, that the first parameter is at least one of the plurality of values may be understood as that the first parameter may be one or more values. When the first parameter is a plurality of values, the terminal device may select one from the plurality of values for generating the random access preamble sequence. This is not limited in this embodiment of this application.

Optionally, the network device may further send second information to the terminal device, where the second information is used to indicate a set type to be used by the terminal device to generate the random access preamble sequence, and the set type includes an unrestricted set, the restricted set type A, or the restricted set type B. Correspondingly, the terminal device may receive the second information from the network device, and generate the random access preamble sequence based on the second information.

It should be understood that, in this embodiment of this application, that the second information is used to indicate the set type may be understood as that the second information explicitly indicates and/or implicitly indicates the set type. This is not limited in this embodiment of this application.

In an optional embodiment, when the set type is the restricted set type A, the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57.

In another optional embodiment, when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

According to the information transmission method provided in this embodiment of this application, the network device can configure, for the terminal device by using the second information, the set type used to generate the random access preamble sequence. The set type is the unrestricted set, the restricted set type A, or the restricted set type B.

Optionally, the terminal device may generate the random access preamble sequence based on the first information and the second information. This is not limited in this embodiment of this application.

Optionally, the network device may further send third information to the terminal device, where the third information is used to indicate a time-frequency resource to be used by the terminal device to send the random access preamble sequence. Correspondingly, the terminal device receives the third information from the network device, and sends the random access preamble sequence to the network device based on the third information.

Optionally, the sending, by the terminal device, the random access preamble sequence based on the third information may be determining, by the terminal device, the time-frequency resource based on the third information, and sending the random access preamble sequence on the time-frequency resource.

It should be understood that, in this embodiment of this application, that the third information is used to indicate the time-frequency resource may be understood as that the third information explicitly indicates and/or implicitly indicates the time-frequency resource. This is not limited in this embodiment of this application.

Optionally, a value of a subcarrier spacing of a random access channel of the communications system is not limited in this embodiment of this application. The subcarrier spacing may be, for example, 1.25 KHz, 5 KHz, or another value.

It should be understood that in the LTE system, the network device instructs, by using a field highSpeedFlag, a terminal device in release Rel-13 or an earlier release to generate a random access preamble sequence by using the unrestricted set or the restricted set type A, and indicates, based on whether a field PRACH-Config-v1430 is broadcast in a system message, whether Rel-14 UE is to use the restricted set type B to generate a random access preamble sequence.

In other words, the three different set types need to be indicated by using two pieces of signaling. Therefore, in the prior art, signaling used to indicate the set type to be used by the terminal device to generate the random access preamble sequence is relatively complex.

Figure 3:
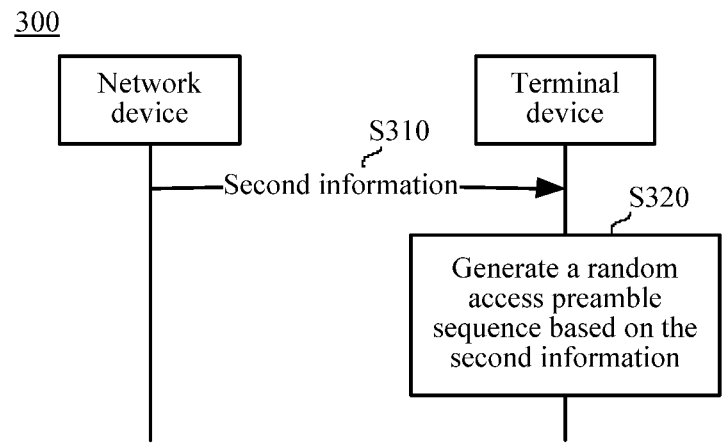
FIG. 3 is a schematic flowchart of another information transmission method according to an embodiment of this application.

FIG. 3 is a schematic flowchart of an information transmission method 300 according to an embodiment of this application. The method 300 can be applied to the communications system shown in FIG. 1.

S310. The network device sends second information to the terminal device, where the second information is used to indicate a set type to be used by the terminal device to generate a random access preamble sequence, and the set type includes an unrestricted set, a restricted set type A, or a restricted set type B; and correspondingly, the terminal device receives the second information from the network device.

S320. The terminal device generates the random access preamble sequence based on the second information.

According to the information transmission method provided in this embodiment of this application, the network device can configure, for the terminal device by using the second information, the set type used to generate the random access preamble sequence. The set type is the unrestricted set, the restricted set type A, or the restricted set type B.

Optionally, before S310, the network device may first determine the set type.

Optionally, in S320, the generating, by the terminal device, the random access preamble sequence based on the second information may be determining, by the terminal device, the set type based on the second information, and generating the random access preamble sequence based on the set type.

Optionally, in S310, the sending, by the network device, second information to the terminal device may be sending, by the network device, the second information to the terminal device by using first signaling.

Optionally, the first signaling may be, for example, signaling in remaining system information (remaining system information, RMSI) or other signaling. This is not limited in this embodiment of this application.

Optionally, the first signaling in this embodiment of this application may be existing signaling or newly designed signaling. This is not limited in this embodiment of this application.

Optionally, the network device may send the second information to the terminal device by using a first field of the first signaling.

It should be understood that, in this embodiment of this application, that the second information is used to indicate the set type may be understood as that the second information explicitly indicates and/or implicitly indicates the set type. This is not limited in this embodiment of this application.

In an optional embodiment, the second information may explicitly indicate the set type. For example, the network device explicitly indicates, by using the first field, that the set type is the unrestricted set, the restricted set type A, or the restricted set type B.

Optionally, when the first signaling is the signaling in the RMSI, the first field may be a field highSpeedFlag.

Optionally, the first field in this embodiment of this application may be an existing field or a newly designed field in the existing signaling. This is not limited in this embodiment of this application.

For example, one piece of signaling in existing RMSI is:

| PRACH-ConfigInfo ::= | SEQUENCE { |
|---|---|
| prach-ConfigIndex | INTEGER (0..63), |
| highSpeedFlag | BOOLEAN, |
| zeroCorrelationZoneConfig | INTEGER (0..15), |
| prach-FreqOffset | INTEGER (0..94) |
| } | |

To be specific, the terminal device is instructed, by using the field highSpeedFlag, to generate the random access preamble sequence by using a generation method corresponding to the unrestricted set or the restricted set type A.

For example, when a value of the field highSpeedFlag is 0, it indicates that the unrestricted set is to be used; or when a value of the field highSpeedFlag is 1, it indicates that the restricted set type A is to be used. This is not limited in this embodiment of this application.

Optionally, in this embodiment of this application, the foregoing signaling may be changed to:

| PRACH-ConfigInfo ::= | SEQUENCE { |
|---|---|
| ...... | |
| highSpeedFlag | INTEGER (0..3), |
| zeroCorrelationZoneConfig | INTEGER (0..15), |
| ...... | |
| } | |

To be specific, a variable type of the field highSpeedFlag is changed from a boolean (boolean) type to an integer type, and the terminal device is instructed, by using different values of the field, to use the unrestricted set, the restricted set type A, or the restricted set type B.

According to the information transmission method provided in this embodiment of this application, the three set types can be indicated by using one piece of signaling. A signaling procedure is relatively simple, and a configuration is flexible.

In another optional embodiment, the second information may implicitly indicate the set type. For example, the network device sends the first field to the terminal device, where the first field is used to indicate, by indicating whether a second field is sent, whether the set type to be used by the terminal device is a first type of set or another type of set (including a second type of set and a third type of set), and when the first field indicates that the second field is sent, the second field is used to indicate that the set type is the second type of set or the third type of set.

Correspondingly, the terminal device determines, based on the first field that indicates whether the second field is sent, whether the set type is the first type of set or the another type of set (including the second type of set and the third type of set). For example, if the first field indicates that the second field is not sent, the terminal device determines that the set type is the first type of set; or if the first field indicates that the second field is sent, the terminal device determines that the set type is the another type of set. When the first field indicates that the second field is sent, the terminal device further determines, based on the second field, that the set type is the second type of set or the third type of set.

Optionally, that the first field is used to indicate, to the terminal device by indicating whether the second field is sent, whether the set type is the first type of set or the another type of set may be understood as that the first field is used to indicate, by indicating whether the terminal device receives the second field, whether the set type is the first type of set or the another type of set, or may be understood as that the first field is used to indicate, by indicating whether signaling received by the terminal device includes the second field, whether the set type is the first type of set or the another type of set. This is not limited in this embodiment of this application.

It should be understood that, the first type of set, the second type of set, and the third type of set are in a one-to-one correspondence with the unrestricted set, the restricted set type A, and the restricted set type B. However, a specific correspondence is not limited in this embodiment of this application.

It should be further understood that, specific indication manners of the first field and the second field are not limited in this embodiment of this application.

Optionally, the first field and the second field may be carried in a same piece of signaling, or carried in different pieces of signaling. This is not limited in this embodiment of this application.

Optionally, the second field may be, for example, the field highSpeedFlag.

Optionally, the network device may further send first information to the terminal device, where the first information is used to indicate a first parameter to be used by the terminal device to generate the random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45. Correspondingly, the terminal device receives the first information from the network device, and generates the random access preamble sequence based on the first information.

It should be understood that, in this embodiment of this application, that the first information is used to indicate the first parameter may be understood as that the first information explicitly indicates and/or implicitly indicates the first parameter. This is not limited in this embodiment of this application.

Optionally, the terminal device may generate the random access preamble sequence based on the first information and the second information. This is not limited in this embodiment of this application.

Optionally, when the set type is the restricted set type A, the first parameter to be used by the terminal device to generate the random access preamble sequence is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

Optionally, the network device sends third information to the terminal device, where the third information is used to indicate a time-frequency resource to be used by the terminal device to send the random access preamble sequence. Correspondingly, the terminal device may receive the third information from the network device, and send the random access preamble sequence based on the third information.

Optionally, the sending, by the terminal device, the random access preamble sequence based on the third information comprising: determining, by the terminal device, a time-frequency resource for sending the random access preamble sequence based on the third information, and sending the random access preamble sequence on the determined time-frequency resource.

It should be understood that, in this embodiment of this application, that the third information is used to indicate the time-frequency resource may be understood as that the third information explicitly indicates and/or implicitly indicates the time-frequency resource. This is not limited in this embodiment of this application.

Optionally, a value of a subcarrier spacing of a random access channel of the communications system is not limited in this embodiment of this application. The subcarrier spacing may be, for example, 1.25 KHz, 5 KHz, or another value.

Figure 4:
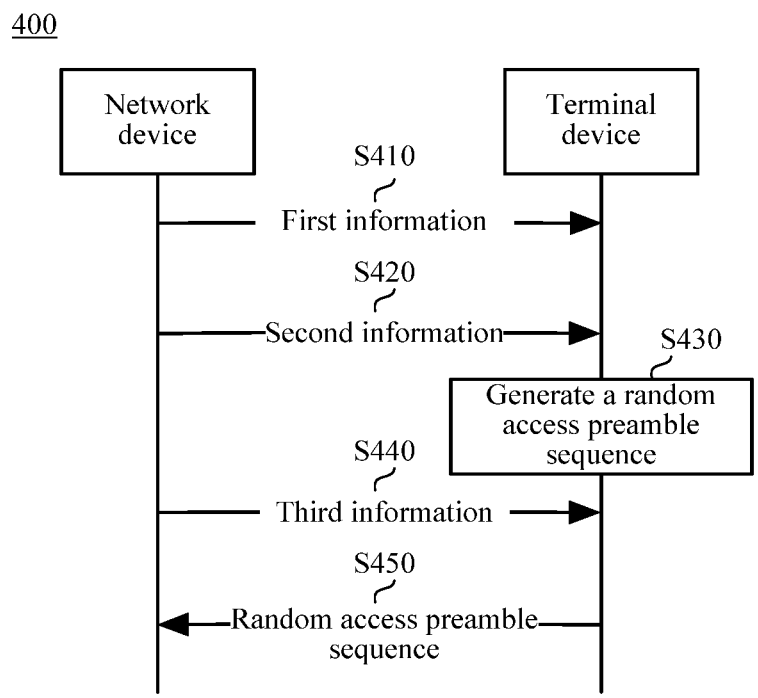
FIG. 4 is a schematic flowchart of still another information transmission method according to an embodiment of this application.

FIG. 4 is a schematic flowchart of an information transmission method 400 according to an embodiment of this application. The method 400 is applied to the communications system too shown in FIG. 1.

S410. The network device sends first information to the terminal device, where the first information is used to indicate a first parameter to be used by the terminal device to generate a random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45; and correspondingly, the terminal device receives the first information from the network device.

S420. The network device sends second information to the terminal device, where the second information is used to indicate a set type to be used by the terminal device to generate the random access preamble sequence, and the set type includes an unrestricted set, a restricted set type A, or a restricted set type B; and correspondingly, the terminal device receives the second information from the network device.

Optionally, the network device may send the second information to the terminal device by using first signaling.

Optionally, the network device may send the second information to the terminal device by using a first field of the first signaling.

S430. The terminal device generates the random access preamble sequence based on the first information and the second information.

Optionally, the terminal device may determine the first parameter based on the first information, determine the set type based on the second information, and generate the random access preamble sequence based on the first parameter and the set type.

S440. The network device sends third information to the terminal device, where the third information is used to indicate a time-frequency resource to be used by the terminal device to send the random access preamble sequence; and correspondingly, the terminal device receives the third information from the network device.

S450. The terminal device sends the random access preamble sequence to the network device based on the third information.

Optionally, the terminal device may determine the time-frequency resource based on the third information, and send the random access preamble sequence on the time-frequency resource.

It should be understood that, there is no execution order of 8410, S420, and S440 in this embodiment of this application.

The information transmission method provided in the embodiments of this application is described above in detail with reference to FIG. 1 to FIG. 4, and information transmission apparatuses provided in the embodiments of this application are described below with reference to FIG. 5 to FIG. 12.

Figure 5:
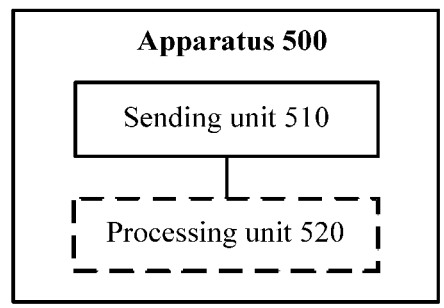
FIG. 5 is a schematic block diagram of an information transmission apparatus according to an embodiment of this application.

FIG. 5 is a schematic block diagram of an information transmission apparatus 500 according to an embodiment of this application. The apparatus 500 includes:

a sending unit 510, configured to send first information to a terminal device, where the first information is used to indicate a first parameter to be used by the terminal device to generate a random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the first parameter is at least one of 153, 137, 122, 109, 97, 85, 81, 77, 74, 71, 68, 65, 63, 60, 57, 55, 53, 51, 50, 48, 47, and 45.

Optionally, the apparatus 500 further includes a processing unit 520, and the processing unit 520 is configured to determine the first information before the sending unit 510 sends the first information to the terminal device.

Optionally, the sending unit is further configured to send second information to the terminal device. The second information is used to indicate a set type to be used by the terminal device to generate the random access preamble sequence, and the set type includes an unrestricted set, a restricted set type A, or a restricted set type B.

Optionally, when the set type is the restricted set type A, the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

Optionally, the first parameter is a zero correlation zone.

It should be understood that the apparatus 500 herein is represented in a form of a functional unit. The term "unit" herein may be an application-specific integrated circuit (ASIC), an electronic circuit, a processor for executing one or more software or firmware programs (for example, a shared processor, a dedicated processor, or a packet processor) and a memory, a combined logic circuit, and/or another appropriate component supporting the described function. In an optional example, a person skilled in the art may understand that the apparatus 500 may be specifically the network device in the foregoing embodiments of the method 200 to the method 400, and the apparatus 500 may be configured to perform the procedures and/or steps corresponding to the network device in the foregoing embodiments of the method 200 to the method 400. To avoid repetition, details are not described herein again.

Figure 6:
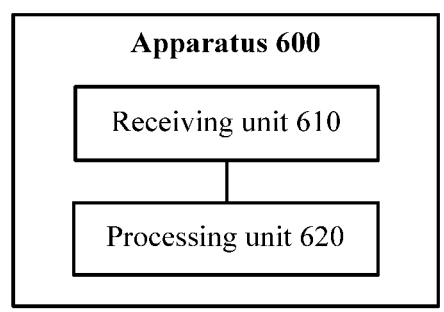
FIG. 6 is a schematic block diagram of another information transmission apparatus according to an embodiment of this application.

FIG. 6 is a schematic block diagram of an information transmission apparatus 600 according to an embodiment of this application. The apparatus 600 includes: a receiving unit 610, configured to receive first information from a network device, where the first information is used to indicate a first parameter to be used by the terminal device to generate a random access preamble sequence, and the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57, or the parameter is at least one of 153, 137, 122, 109, 97, 85, 81, 77, 74, 71, 68, 65, 63, 60, 57, 55, 53, 51, 50, 48, 47, and 45; and a processing unit 620, configured to generate the random access preamble sequence based on the first information received by the receiving unit 610.

Optionally, the processing unit is specifically configured to: determine the first parameter based on the first information, and generate the random access preamble sequence based on the first parameter.

Optionally, the receiving unit is further configured to receive second information from the network device. The second information is used to indicate a set type to be used by the terminal device to generate the random access preamble sequence, and the set type includes an unrestricted set, a restricted set type A, or a restricted set type B. The processing unit is specifically configured to generate the random access preamble sequence based on the first information and the second information.

Optionally, when the set type is the restricted set type A, the first parameter is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 122, 109, 97, 85, 81, 77, 71, 68, 65, 63, 60, 57, 54, 53, 51, and 50.

Optionally, the first parameter is a zero correlation zone.

It should be understood that the apparatus 600 herein is represented in a form of a functional unit. The term "unit" herein may be an ASIC, an electronic circuit, a processor for executing one or more software or firmware programs (for example, a shared processor, a dedicated processor, or a packet processor) and a memory, a combined logic circuit, and/or another appropriate component supporting the described function. In an optional example, a person skilled in the art may understand that the apparatus 600 may be specifically the terminal device in the foregoing embodiments of the method 200 to the method 400, and the apparatus 600 may be configured to perform the procedures and/or steps corresponding to the terminal device in the foregoing embodiments of the method 200 to the method 400. To avoid repetition, details are not described herein again.

Figure 7:
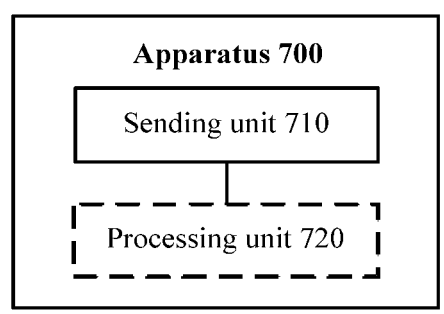
FIG. 7 is a schematic block diagram of still another information transmission apparatus according to an embodiment of this application.

FIG. 7 is a schematic block diagram of an information transmission apparatus 700 according to an embodiment of this application. The apparatus 700 includes: a sending unit 710, configured to send second information to a terminal device, where the second information is used to indicate a set type to be used by the terminal device to generate a random access preamble sequence, and the set type includes an unrestricted set, a restricted set type A, or a restricted set type B.

Optionally, the apparatus 700 further includes a processing unit 720, and the processing unit 720 is configured to determine the set type before the sending unit 710 sends the second information.

Optionally, the sending unit is specifically configured to send the second information to the terminal device by using first signaling.

Optionally, the second information is carried in a first field of the first signaling.

Optionally, when the set type is the restricted set type A, a first parameter to be used by the terminal device to generate the random access preamble sequence is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

It should be understood that the apparatus 700 herein is represented in a form of a functional unit. The term "unit" herein may be an ASIC, an electronic circuit, a processor for executing one or more software or firmware programs (for example, a shared processor, a dedicated processor, or a packet processor) and a memory, a combined logic circuit, and/or another appropriate component supporting the described function. In an optional example, a person skilled in the art may understand that the apparatus 700 may be specifically the network device in the foregoing embodiments of the method 200 to the method 400, and the apparatus 700 may be configured to perform the procedures and/or steps corresponding to the network device in the foregoing embodiments of the method 200 to the method 400. To avoid repetition, details are not described herein again.

Figure 8:
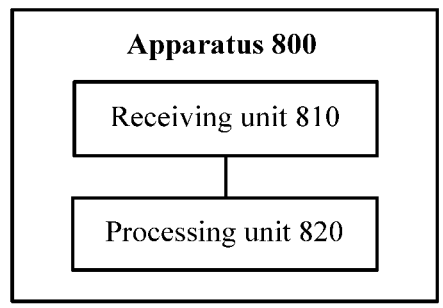
FIG. 8 is a schematic block diagram of still another information transmission apparatus according to an embodiment of this application.

FIG. 8 is a schematic block diagram of an information transmission apparatus 800 according to an embodiment of this application. The apparatus 800 includes: a receiving unit 810, configured to receive second information from a network device, where the second information is used to indicate a set type to be used by the terminal device to generate a random access preamble sequence, and the set type includes an unrestricted set, a restricted set type A, or a restricted set type B; and a processing unit 820, configured to generate the random access preamble sequence based on the second information received by the receiving unit 810.

Optionally, the processing unit is specifically configured to: determine the set type based on the second information, and generate the random access preamble sequence based on the set type.

Optionally, the receiving unit is specifically configured to receive the second information from the network device by using first signaling.

Optionally, the second information is carried in a first field of the first signaling.

Optionally, when the set type is the restricted set type A, a first parameter to be used by the terminal device to generate the random access preamble sequence is at least one of 237, 216, 195, 173, 152, 137, 132, 127, 121, 117, 112, 108, 103, 99, 94, 91, 89, 86, 84, 81, 77, 74, 72, 69, 68, 67, 66, 64, 63, 62, 61, 59, 58, and 57; or when the set type is the restricted set type B, the first parameter is at least one of 153, 137, 122, 109, 97, 85, 81, 77, 74, 71, 68, 65, 63, 60, 57, 55, 53, 51, 50, 48, 47, and 45.

It should be understood that the apparatus 800 herein is represented in a form of a functional unit. The term "unit" herein may be an ASIC, an electronic circuit, a processor for executing one or more software or firmware programs (for example, a shared processor, a dedicated processor, or a packet processor) and a memory, a combined logic circuit, and/or another appropriate component supporting the described function. In an optional example, a person skilled in the art may understand that the apparatus 800 may be specifically the terminal device in the foregoing embodiments of the method 200 to the method 400, and the apparatus 800 may be configured to perform the procedures and/or steps corresponding to the terminal device in the foregoing embodiments of the method 200 to the method 400. To avoid repetition, details are not described herein again.

Figure 9:
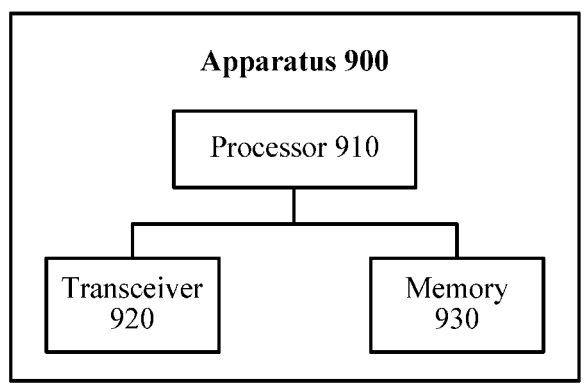
FIG. 9 is a schematic block diagram of still another information transmission apparatus according to an embodiment of this application.

FIG. 9 shows an information transmission apparatus 900 according to an embodiment of this application. The apparatus 900 may be the network device in FIG. 1 to FIG. 4, and a hardware architecture shown in FIG. 9 may be used in the network device. The network device may include a processor 910, a transceiver 920, and a memory 930. The processor 910, the transceiver 920, and the memory 930 communicate with each other by using an internal connection path. A related function implemented by the processing unit 520 in FIG. 5 may be implemented by the processor 910, and a related function implemented by the sending unit 510 in FIG. 5 may be implemented by the processor 910 by controlling the transceiver 920.

The processor 910 may include one or more processors, for example, one or more central processing units (CPU). When the processor is one CPU, the CPU may be a single-core CPU or may be a multi-core CPU.

The transceiver 920 is configured to send data and/or a signal, and receive data and/or a signal. The transceiver may include a transmitter and a receiver, the transmitter is configured to send data and/or a signal, and the receiver is configured to receive data and/or a signal.

The memory 930 includes but is not limited to a random access memory (RAM), a read-only memory (ROM), an erasable programmable memory (EPROM), and a compact disc read-only memory (CD-ROM). The memory 930 is configured to store a related instruction and related data.

The memory 930 is configured to store program code and data of the network device. The memory 930 may be an independent component or integrated into the processor 910.

Specifically, the processor 910 is configured to control the transceiver to communicate with a terminal device. For details, refer to the descriptions in the method embodiments. The details are not described herein again.

It may be understood that, FIG. 9 shows only a simplified design of the network device. In an actual application, the network device may further include other necessary elements, including but not limited to any quantity of transceivers, processors, controllers, memories, and the like. All network devices that can implement this application fall within the protection scope of this application.

In a possible design, the apparatus 900 may be a chip, for example, a communications chip that can be used in the network device and that is configured to implement a related function of the processor 910 in the network device. The chip may be a field programmable gate array, an application-specific integrated chip, a system chip, a central processing unit, a network processor, a digital signal processing circuit, or a microcontroller that can implement the related function; or may be a programmable controller or another integrated chip. Optionally, the chip may include one or more memories, configured to store program code. When the code is executed, the processor implements a corresponding function.

Figure 10:
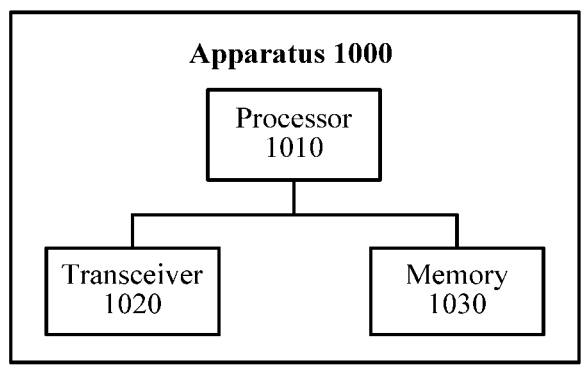
FIG. 10 is a schematic block diagram of still another information transmission apparatus according to an embodiment of this application.

FIG. 10 shows an information transmission apparatus 1000 according to an embodiment of this application. The apparatus 1000 may be the terminal device in FIG. 1 to FIG. 4, and a hardware architecture shown in FIG. 10 may be used in the terminal device. The terminal device may include a processor 1010, a transceiver 1020, and a memory 1030. The processor 1010, the transceiver 1020, and the memory 1030 communicate with each other by using an internal connection path. A related function implemented by the processing unit 620 in FIG. 6 may be implemented by the processor 1010, and a related function implemented by the receiving unit 610 in FIG. 6 may be implemented by the processor 1010 by controlling the transceiver 1020.

The processor 1010 may include one or more processors, for example, one or more CPUs. When the processor is one CPU, the CPU may be a single-core CPU or may be a multi-core CPU.

The transceiver 1020 is configured to send data and/or a signal, and receive data and/or a signal. The transceiver may include a transmitter and a receiver, the transmitter is configured to send data and/or a signal, and the receiver is configured to receive data and/or a signal.

The memory 1030 includes but is not limited to a RAM, a ROM, an EPROM, and a CD-ROM. The memory 1030 is configured to store a related instruction and related data.

The memory 1030 is configured to store program code and data of the terminal device. The memory 1030 may be an independent component or integrated into the processor 1010.

Specifically, the processor 1010 is configured to control the transceiver to communicate with a network device. For details, refer to the descriptions in the method embodiments. The details are not described herein again.

It may be understood that FIG. 10 shows only a simplified design of the terminal device. In an actual application, the terminal device may further include other necessary elements, including but not limited to any quantity of transceivers, processors, controllers, memories, and the like. All terminal devices that can implement this application fall within the protection scope of this application.

In a possible design, the apparatus 1000 may be a chip, for example, a communications chip that can be used in the terminal device and that is configured to implement a related function of the processor 1010 in the terminal device. The chip may be a field programmable gate array, an application-specific integrated chip, a system chip, a central processing unit, a network processor, a digital signal processing circuit, or a microcontroller that can implement the related function; or may be a programmable controller or another integrated chip. Optionally, the chip may include one or more memories, configured to store program code. When the code is executed, the processor implements a corresponding function.

Figure 11:
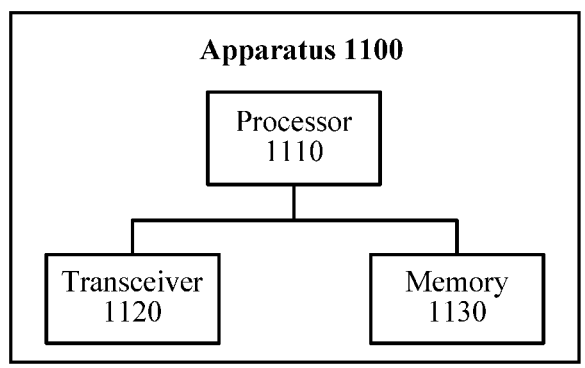
FIG. 11 is a schematic block diagram of still another information transmission apparatus according to an embodiment of this application.

FIG. 11 shows an information transmission apparatus 1100 according to an embodiment of this application. The apparatus 1100 may be the network device in FIG. 1 to FIG. 4, and a hardware architecture shown in FIG. 11 may be used in the network device. The network device may include a processor 1110, a transceiver 1120, and a memory 1130. The processor 1110, the transceiver 1120, and the memory 1130 communicate with each other by using an internal connection path. A related function implemented by the processing unit 720 in FIG. 7 may be implemented by the processor 1110, and a related function implemented by the sending unit 710 in FIG. 7 may be implemented by the processor 1110 by controlling the transceiver 1120.

The processor 1110 may include one or more processors, for example, one or more CPUs. When the processor is one CPU, the CPU may be a single-core CPU or may be a multi-core CPU.

The transceiver 1120 is configured to send data and/or a signal, and receive data and/or a signal. The transceiver may include a transmitter and a receiver, the transmitter is configured to send data and/or a signal, and the receiver is configured to receive data and/or a signal.

The memory 1130 includes but is not limited to a RAM, a ROM, an EPROM, and a CD-ROM. The memory 1130 is configured to store a related instruction and related data.

The memory 1130 is configured to store program code and data of the network device. The memory 1130 may be an independent component or integrated into the processor 1110.

Specifically, the processor 1110 is configured to control the transceiver to communicate with a terminal device. For details, refer to the descriptions in the method embodiments. The details are not described herein again.

It may be understood that, FIG. 11 shows only a simplified design of the network device. In an actual application, the network device may further include other necessary elements, including but not limited to any quantity of transceivers, processors, controllers, memories, and the like. All network devices that can implement this application fall within the protection scope of this application.

In a possible design, the apparatus 1100 may be a chip, for example, a communications chip that can be used in the network device and that is configured to implement a related function of the processor 1110 in the network device. The chip may be a field programmable gate array, an application-specific integrated chip, a system chip, a central processing unit, a network processor, a digital signal processing circuit, or a microcontroller that can implement the related function; or may be a programmable controller or another integrated chip. Optionally, the chip may include one or more memories, configured to store program code. When the code is executed, the processor implements a corresponding function.

Figure 12:
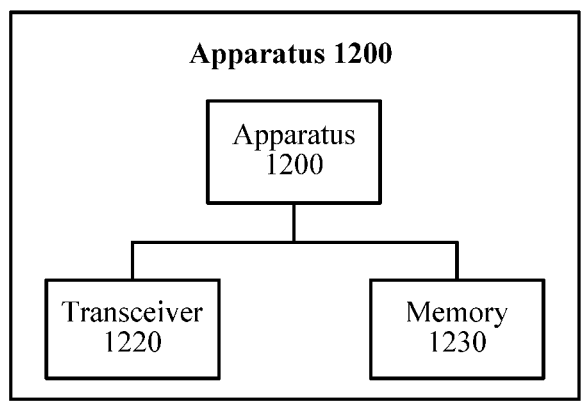
FIG. 12 is a schematic block diagram of still another information transmission apparatus according to an embodiment of this application.

FIG. 12 shows an information transmission apparatus 1200 according to an embodiment of this application. The apparatus 1200 may be the terminal device in FIG. 1 to FIG. 4, and a hardware architecture shown in FIG. 12 may be used in the terminal device. The terminal device may include a processor 1210, a transceiver 1220, and a memory 1230. The processor 1210, the transceiver 1220, and the memory 1230 communicate with each other by using an internal connection path. A related function implemented by the processing unit 820 in FIG. 8 may be implemented by the processor 1210, and a related function implemented by the receiving unit 810 in FIG. 8 may be implemented by the processor 1210 by controlling the transceiver 1220.

The processor 1210 may include one or more processors, for example, one or more CPUs. When the processor is one CPU, the CPU may be a single-core CPU or may be a multi-core CPU.

The transceiver 1220 is configured to send data and/or a signal, and receive data and/or a signal. The transceiver may include a transmitter and a receiver, the transmitter is configured to send data and/or a signal, and the receiver is configured to receive data and/or a signal.

The memory 1230 includes but is not limited to a RAM, a ROM, an EPROM, and a CD-ROM. The memory 1230 is configured to store a related instruction and related data.

The memory 1230 is configured to store program code and data of the terminal device. The memory 1230 may be an independent component or integrated into the processor 1210.

Specifically, the processor 1210 is configured to control the transceiver to communicate with a network device. For details, refer to the descriptions in the method embodiments. The details are not described herein again.

It may be understood that FIG. 12 shows only a simplified design of the terminal device. In an actual application, the terminal device may further include other necessary elements, including but not limited to any quantity of transceivers, processors, controllers, memories, and the like. All terminal devices that can implement this application fall within the protection scope of this application.

In a possible design, the apparatus 1200 may be a chip, for example, a communications chip that can be used in the terminal device and that is configured to implement a related function of the processor 1210 in the terminal device. The chip may be a field programmable gate array, an application-specific integrated chip, a system chip, a central processing unit, a network processor, a digital signal processing circuit, or a microcontroller that can implement the related function; or may be a programmable controller or another integrated chip. Optionally, the chip may include one or more memories, configured to store program code. When the code is executed, the processor implements a corresponding function.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a device, first information from a network device, wherein the first information indicates a first parameter for generating a random access preamble sequence;
   receiving, by the device, second information from the network device, wherein the second information indicates that a set type is an unrestricted set, a restricted set type A, or a restricted set type B, wherein at least one of the unrestricted set, the restricted set type A, and the restricted set type B is associated with a set of values of the first parameter;
   determining, by the device, a value of the first parameter according to the first information and the second information, wherein determining the value of the first parameter according to the first information and the second information comprises:
      in response to the set type being the restricted set type A, determining the value of the first parameter from a first set of values of the first parameter according to the first information, and the first set of values comprises: 216, 195, 173, 152, 137, 132, 121, 112, 103, 94, 89, 81, 72, and 57; or
      in response to the set type being the restricted set type B, determining the value of the first parameter from a second set of values of the first parameter according to the first information, and the second set of values comprises: 122, 109, 97, 85, 81, 77, 71, 68, 65, 63, 60, and 57; and
   generating, by the device, the random access preamble sequence according to the value of the first parameter.

2. The method according to claim 1, wherein the first set of values further comprises 237 or 36, and the second set of values further comprises 137 or 36.

3. The method according to claim 1, wherein the first information is a zero correlation zone configuration.

4. The method according to claim 1, further comprising:
receiving third information from the network device, the third information indicating a time-frequency resource for sending the random access preamble sequence; and
sending the random access preamble sequence according to the third information.

5. A method, comprising:
determining, by a network device, first information and second information, wherein the first information indicates a first parameter for generating a random access preamble sequence, and the second information indicates that a set type is an unrestricted set, a restricted set type A, or a restricted set type B, wherein at least one of the unrestricted set, the restricted set type A, and the restricted set type B is associated with a set of values of the first parameter; wherein a first set of values of the first parameter associated with the restricted set type A comprises: 216, 195, 173, 152, 137, 132, 121, 112, 103, 94, 89, 81, 72, and 57, or a second set of values of the first parameter associated with the restricted set type B comprises: 122, 109, 97, 85, 81, 77, 71, 68, 65, 63, 60, and 57; and
sending, by the network device, the first information and the second information to a terminal device.

6. The method according to claim 5, wherein the first set of values further comprises 237 or 36, and the second set of values further comprises 137 or 36.

7. The method according to claim 5, wherein the first information is a zero correlation zone configuration.

8. The method according to claim 5, further comprising:
sending third information to the terminal device, the third information indicating a time-frequency resource for sending the random access preamble sequence.

9. An apparatus, comprising:
a receiver, configured to receive first information and second information from a network device, wherein the first information indicates a first parameter for generating a random access preamble sequence, and the second information indicates that a set type is an unrestricted set, a restricted set type A, or a restricted set type B, wherein at least one of the unrestricted set, the restricted set type A, and the restricted set type B is associated with a set of values of the first parameter; and
a processor, configured to:
determine a value of the first parameter according to the first information and the second information, wherein determining the value of the first parameter according to the first information and the second information comprises:
in response to the set type being the restricted set type A, determining the value of the first parameter from a first set of values of the first parameter according to the first information, and the first set of values comprises: 216, 195, 173, 152, 137, 132, 121, 112, 103, 94, 89, 81, 72, and 57; or
in response to the set type being the restricted set type B, determining the value of the first parameter from a second set of values of the first parameter according to the first information, and the second set of values comprises: 122, 109, 97, 85, 81, 77, 71, 68, 65, 63, 60, and 57; and
generate the random access preamble sequence according to the first information.

10. The apparatus according to claim 9, wherein the first set of values further comprises 237 or 36, and the second set of values further comprises 137 or 36.

11. The apparatus according to claim 9, wherein the first information is a zero correlation zone configuration.

12. The apparatus according to claim 9, wherein the apparatus further comprises a non-transitory memory configured to store an association between sets of values and set types.

13. The apparatus according to claim 9, wherein the apparatus further comprises a non-transitory memory configured to store an association between a zero correlation zone configuration, one set type, and one value of the first parameter.

14. The apparatus according to claim 9, wherein:
the receiver is further configured to receive third information from the network device, the third information indicates a time-frequency resource for sending the random access preamble sequence; and
the apparatus further comprises a transmitter configured to send the random access preamble sequence according to the third information.

15. The apparatus according to claim 9, wherein the first parameter is explicitly indicated by the first information.

16. The apparatus according to claim 9, wherein the first parameter is implicitly indicated by the first information.

17. An apparatus, comprising:
a processor configured to determine first information and second information, wherein the first information indicates a first parameter generating a random access preamble sequence, and the second information indicates that a set type is an unrestricted set, a restricted set type A, or a restricted set type B; wherein at least one of the unrestricted set, the restricted set type A, and the restricted set type B is associated with a set of values of the first parameter, wherein a first set of values of the first parameter associated with the restricted set type A comprises: 216, 195, 173, 152, 137, 132, 121, 112, 103, 94, 89, 81, 72, and 57, or a second set of values of the first parameter associated with the restricted set type B comprises: 122, 109, 97, 85, 81, 77, 71, 68, 65, 63, 60, and 57; and
a transmitter, configured to send the first information and the second information to a terminal device.

18. The apparatus according to claim 17, wherein the first set of values further comprises 36, and the second set of values comprises 36.

19. The apparatus according to claim 17, wherein the first information is a zero correlation zone configuration.

20. The apparatus according to claim 17, wherein the transmitter is further configured to transmit third information to the terminal device, the third information indicates a time-frequency resource for sending the random access preamble sequence.

21. A non-transitory computer-readable storage medium, wherein the computer-readable storage medium comprises a computer program, and when the computer program runs on an apparatus, the apparatus performs an information transmission method comprising:
receiving first information from a network device, wherein the first information indicates a first parameter to be used for generating a random access preamble sequence;
receiving second information from the network device, wherein the second information indicates that a set type is an unrestricted set, a restricted set type A, or a restricted set type B, wherein at least one of the unrestricted set, the restricted set type A, and the restricted set type B is associated with a set of values of the first parameter;

determining a value of the first parameter according to the first information and the second information, wherein determining the value of the first parameter according to the first information and the second information comprises:

in response to the set type being the restricted set type A, determining the value of the first parameter from a first set of values of the first parameter according to the first information, and the first set of values comprises: 216, 195, 173, 152, 137, 132, 121, 112, 103, 94, 89, 81, 72, and 57; or in response to the set type being the restricted set type B, determining the value of the first parameter from a second set of values of the first parameter according to the first information, and the second set of values comprises: 122, 109, 97, 85, 81, 77, 71, 68, 65, 63, 60, and 57; and generating the random access preamble sequence according to the value of the first parameter.

22. A non-transitory computer-readable storage medium, wherein the computer-readable storage medium comprises a computer program, and when the computer program runs on an apparatus, the apparatus performs an information transmission method comprising:

determining first information and second information, wherein the first information indicates a first parameter for generating a random access preamble sequence, and the second information indicates that a set type is an unrestricted set, a restricted set type A, or a restricted set type B, wherein at least one of the unrestricted set, the restricted set type A, and the restricted set type B is associated with a set of values of the first parameter, wherein a first set of values of the first parameter associated with the restricted set type A comprises: 216, 195, 173, 152, 137, 132, 121, 112, 103, 94, 89, 81, 72, 57, and 36, or a second set of values of the first parameter associated with the restricted set type B comprises: 122, 109, 97, 85, 81, 77, 71, 68, 65, 63, 60, and 57; and sending the first information and the second information to a terminal device.

\* \* \* \* \*